(12) United States Patent
Srinivasan et al.

(10) Patent No.: US 12,204,538 B1
(45) Date of Patent: Jan. 21, 2025

(54) DYNAMICALLY TAILORED TIME INTERVALS FOR FEDERATED QUERY SYSTEM

(71) Applicant: Optum, Inc., Minnetonka, MN (US)

(72) Inventors: Srivatsan Srinivasan, Lake Stevens, WA (US); Priyadarshni Natarajan, Redmond, WA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/242,954

(22) Filed: Sep. 6, 2023

(51) Int. Cl.
*G06F 16/20* (2019.01)
*G06F 16/2453* (2019.01)
*G06F 16/25* (2019.01)

(52) U.S. Cl.
CPC ...... *G06F 16/24542* (2019.01); *G06F 16/256* (2019.01)

(58) Field of Classification Search
None
See application file for complete search history.

(56) References Cited

U.S. PATENT DOCUMENTS

| | | | |
|---|---|---|---|
| 1,372,871 | A | 3/1921 | Droll |
| 6,901,403 | B1 | 5/2005 | Bata et al. |
| 6,950,823 | B2 | 9/2005 | Amiri et al. |
| 7,403,956 | B2 | 7/2008 | Vaschillo et al. |
| 7,831,594 | B2 | 11/2010 | Mehta et al. |
| 7,945,581 | B2 | 5/2011 | Bayliss et al. |
| 8,341,104 | B2 | 12/2012 | Manickam et al. |
| 8,515,975 | B1 | 8/2013 | Federici |
| 8,539,345 | B2 | 9/2013 | Appleyard et al. |
| 8,572,031 | B2 | 10/2013 | Merriman et al. |
| 8,762,406 | B2 | 6/2014 | Ho et al. |
| 8,930,410 | B2 | 1/2015 | Alton et al. |

(Continued)

FOREIGN PATENT DOCUMENTS

| | | |
|---|---|---|
| WO | 2012/007745 A2 | 1/2012 |
| WO | 2021/144803 A1 | 7/2021 |

(Continued)

OTHER PUBLICATIONS

Anaissi, et al., "A Personalized Federated Learning Algorithm: An Application in Anomaly Detection", (10 pages), Nov. 5, 2021, arXiv:2111.02627v1.

(Continued)

*Primary Examiner* — Jau Shya Meng
(74) *Attorney, Agent, or Firm* — Alston & Bird LLP

(57) ABSTRACT

Various embodiments of the present disclosure provide federated query processing techniques for dynamically tailoring the use and parameters of intermediary local sources based on the identification of federated query. The techniques include receiving an execution plan for executing a federated query that include a plurality of executable tasks for generating a result set from a plurality of third-party data sources. The techniques include generating a result set hash for the result set based on the execution plan and determining a query uniqueness status for the federated query based on a comparison between the result set hash and a plurality of historical result set hashes. In response to determining that the federated query is a unique query, the techniques include generating a time interval that is tailored to the unique query.

20 Claims, 8 Drawing Sheets

(56) References Cited

U.S. PATENT DOCUMENTS

| | | | |
|---|---|---|---|
| 9,116,812 | B2 | 8/2015 | Joshi et al. |
| 9,246,776 | B2 | 1/2016 | Ellsworth et al. |
| 9,390,112 | B1 | 7/2016 | Daly et al. |
| 9,489,440 | B2 | 11/2016 | Stritzel et al. |
| 9,558,230 | B2 | 1/2017 | Hollifield et al. |
| 9,600,504 | B2 | 3/2017 | Marrelli et al. |
| 9,646,226 | B2 | 5/2017 | Wang et al. |
| 10,185,728 | B2 | 1/2019 | Nath et al. |
| 10,229,161 | B2 | 3/2019 | Kakarla et al. |
| 10,296,524 | B1 | 5/2019 | Tung et al. |
| 10,409,802 | B2 | 9/2019 | Spitz et al. |
| 10,698,954 | B2 | 6/2020 | Piechowicz et al. |
| 10,719,301 | B1 | 7/2020 | Dasgupta et al. |
| 10,762,539 | B2 | 9/2020 | Murugesan et al. |
| 10,817,483 | B1 | 10/2020 | Samdani et al. |
| 10,867,063 | B1 | 12/2020 | Avanes et al. |
| 10,872,236 | B1 | 12/2020 | Elor et al. |
| 10,896,176 | B1 | 1/2021 | Creedon et al. |
| 10,908,926 | B2 | 2/2021 | Coven et al. |
| 11,074,107 | B1 | 7/2021 | Nandakumar |
| 11,093,500 | B2 | 8/2021 | Gladwin et al. |
| 11,094,029 | B2 | 8/2021 | Kalamkar et al. |
| 11,100,420 | B2 | 8/2021 | Dirac et al. |
| 11,113,784 | B2 | 9/2021 | Ray et al. |
| 11,119,980 | B2 | 9/2021 | Szczepanik et al. |
| 11,126,632 | B2 | 9/2021 | Pal et al. |
| 11,157,470 | B2 | 10/2021 | Schuetz |
| 11,204,851 | B1 | 12/2021 | Iyengar et al. |
| 11,281,673 | B2 | 3/2022 | Nanda et al. |
| 11,301,467 | B2 | 4/2022 | Slezak et al. |
| 11,475,350 | B2 | 10/2022 | Mcmahan et al. |
| 11,550,812 | B2* | 1/2023 | Liu .......... G06F 9/54 |
| 2004/0153435 | A1* | 8/2004 | Gudbjartsson ........ G06F 16/284 |
| 2006/0218149 | A1 | 9/2006 | Patrick |
| 2006/0259977 | A1 | 11/2006 | Patrick |
| 2008/0104089 | A1 | 5/2008 | Pragada et al. |
| 2012/0210066 | A1 | 8/2012 | Joshi et al. |
| 2012/0317096 | A1 | 12/2012 | Kaufmann et al. |
| 2013/0086039 | A1 | 4/2013 | Salch et al. |
| 2013/0132360 | A1 | 5/2013 | Kuznetsov et al. |
| 2013/0159288 | A1 | 6/2013 | Nikankin |
| 2015/0169685 | A1 | 6/2015 | Elias et al. |
| 2015/0193697 | A1 | 7/2015 | Vasseur et al. |
| 2016/0147888 | A1 | 5/2016 | Nguyen et al. |
| 2017/0013046 | A1 | 1/2017 | Flynn |
| 2017/0220605 | A1 | 8/2017 | Nivala et al. |
| 2017/0269921 | A1 | 9/2017 | Martin Vicente et al. |
| 2017/0329466 | A1 | 11/2017 | Krenkler et al. |
| 2018/0293276 | A1 | 10/2018 | Bae et al. |
| 2018/0375720 | A1 | 12/2018 | Yang et al. |
| 2019/0146978 | A1 | 5/2019 | Beedgen et al. |
| 2019/0311372 | A1 | 10/2019 | Lindner |
| 2019/0369969 | A1 | 12/2019 | Donohoe et al. |
| 2019/0392296 | A1 | 12/2019 | Brady et al. |
| 2020/0034742 | A1 | 1/2020 | Dirac et al. |
| 2020/0050612 | A1* | 2/2020 | Bhattacharjee ... G06F 16/24526 |
| 2020/0082010 | A1 | 3/2020 | Bodziony et al. |
| 2020/0117434 | A1 | 4/2020 | Biskup et al. |
| 2020/0202171 | A1 | 6/2020 | Hughes et al. |
| 2020/0226012 | A1 | 7/2020 | Pitre et al. |
| 2020/0250525 | A1 | 8/2020 | Kumar Addepalli et al. |
| 2020/0319877 | A1 | 10/2020 | Glazer et al. |
| 2020/0320379 | A1 | 10/2020 | Watson et al. |
| 2020/0349161 | A1 | 11/2020 | Siddiqui et al. |
| 2020/0401891 | A1 | 12/2020 | Xu et al. |
| 2021/0019665 | A1 | 1/2021 | Gur et al. |
| 2021/0081837 | A1 | 3/2021 | Polleri et al. |
| 2021/0097343 | A1 | 4/2021 | Goodsitt et al. |
| 2021/0174164 | A1 | 6/2021 | Hsieh et al. |
| 2021/0286657 | A1 | 9/2021 | Mathur et al. |
| 2021/0294577 | A1 | 9/2021 | Dunn et al. |
| 2021/0304362 | A1 | 9/2021 | Palmaro et al. |
| 2021/0334651 | A1 | 10/2021 | Leng et al. |
| 2021/0390455 | A1 | 12/2021 | Schierz et al. |
| 2022/0067181 | A1 | 3/2022 | Carley |
| 2022/0078264 | A1 | 3/2022 | Mathur |
| 2022/0086393 | A1 | 3/2022 | Peters et al. |
| 2022/0091837 | A1 | 3/2022 | Chai et al. |
| 2022/0108177 | A1 | 4/2022 | Samek et al. |
| 2022/0114451 | A1 | 4/2022 | Muñoz et al. |
| 2022/0129581 | A1 | 4/2022 | Jones et al. |
| 2022/0138561 | A1 | 5/2022 | Prendki |
| 2022/0172040 | A1 | 6/2022 | Kazi et al. |
| 2022/0245176 | A1 | 8/2022 | Weisman |
| 2022/0269691 | A1 | 8/2022 | Liu et al. |
| 2022/0300850 | A1 | 9/2022 | Mendez et al. |
| 2022/0374914 | A1 | 11/2022 | Morrill et al. |
| 2022/0407861 | A1 | 12/2022 | Beecham et al. |
| 2023/0315731 | A1 | 10/2023 | Xu et al. |
| 2024/0134842 | A1 | 4/2024 | Kim et al. |
| 2024/0320231 | A1 | 9/2024 | Bhattacharjee et al. |

FOREIGN PATENT DOCUMENTS

| | | |
|---|---|---|
| WO | 2022/185324 A1 | 9/2022 |
| WO | 2022/269526 A1 | 12/2022 |
| WO | 2023/248204 A1 | 12/2023 |

OTHER PUBLICATIONS

Cai, et al., "The Challenges of Data Quality and Data Quality Assessment in the Big Data Era", Data Science Journal, vol. 14, pp. 1-10, May 15, 2015, DOI: http://dx.doi.org/10.5334/dsj-2015-002.

Costa, et al., "A Survey on Data-Driven Performance Tuning for Big Data Analytics Platforms", Big Data Research, vol. 25, (17 pages), Jan. 27, 2021.

Debattista, et al., "A Methodology and Framework for Linked Data Quality Assessment", ACM Journal of Data and Information Quality, vol. 4, (29 pages), Jan. 2016, DOI: http://dx.doi.org/10.1145/0000000.0000000.

Devarajan, et al., "Acceleration via Multi-Tiered Data Buffering and Prefetching", Journal of Computer Science and Technology, vol. 35, pp. 92-120, Jan. 2020, DOI: 10.1007/s11390-020-9781-1.

Einziger, et al., "A Highly Efficient Cache Admission Policy", (24 pages), Dec. 3, 2015, arXiv:1512.00727v2.

Fuhl, et al., "Explainable Online Validation of Machine Learning Models for Practical Applications", (9 pages), Jan. 17, 2021, arXiv:2010.00821v3.

Hirano, et al., "RanSAP: an Open Dataset of Ransomware Storage Access Patterns for Training Machine Learning Models", Forensic Science International: Digital Investigation, vol. 40, (22 pages), Dec. 16, 2021, https://www.sciencedirect.com/science/article/pii/S2666281721002390.

Immuta, "Immuta Architecture: Dive Deeper into the Platform", (9 pages), Jan. 3, 2023, Retrieved from https://www.immuta.com/product/architecture/.

Jain et al., "Efficient Execution of Quantized Deep Learning Models: a Compiler Approach", (12 pages), Jun. 18, 2020, arXiv:2006.10226v1.

Janardhanan, PS, "Project Repositories for Machine Learning with TensorFlow", ScienceDirect, vol. 171, pp. 188-196, (2020).

Jin, Lei, "Software-Oriented Distributed Shared Cache Management for Chip Multiprocessors", University of Pittsburgh, (133 pages), 2010, http://d-scholarship.pitt.edu/8834/1/Lei.Jin.08.15.2010.PhD.Thesis.pdf.

Kopp, Andreas, "Practical Federated Learning with Azure Machine Learning", Towards Data Science, (21 pages), Aug. 17, 2022, https://towardsdatascience.com/practical-federated-learning-with-azure-machine-learning-8807f9bd1a7e.

Masolo, Claudio, "Google's BigQuery Introduces Column-Level Encryption Functions and Dynamic Masking of Information", InfoQ, (6 pages), Jul. 7, 2022, Retrieved from https://www.infoq.com/news/2022/07/google-bigquery-encryption/.

Pollok, et al., "Open Fabric for Deep Learning Models", IBM Research, (5 pages), 2018, Retrieved at https://openreview.net/pdf?id=SkgCTFpV2X.

Riviè Res, et al., "Eclipse: a Platform for Integrating Development Tools", IBM Systems Journal, (14 pages), Jan. 2004, DOI: 10.1147/sj.432.0371.

(56) References Cited

OTHER PUBLICATIONS

Schwarz, et al., "Augmenting Web Pages and Search Results to Support Credibility Assessment", CHI 2011, (10 pages), May 7, 2011, https://juliaschwarz.net/assets/web-credibility/schwarz-chi11-web-credibility.
Snowflake, "Understanding Dynamic Data Masking", (1 page), Jan. 4, 2023, Retrieved from https://docs.snowflake.com/en/user-guide/security-column-ddm.html.
Vasilache, et al., "Tensor Comprehensions: Framework-Agnostic High-Performance Machine Learning Abstractions", (37 pages), Jun. 29, 2018, arXiv:1802.04730v3.
Witt, et al., "Predictive Performance Modeling for Distributed Computing Using Black-Box Monitoring and Machine Learning", Elsevier, (19 pages), May 30, 2018, arXiv:1805.11877v1.
Yates, et al., "Age-Optimal Constrained Cache Updating", IEEE International Symposium on Information Theory, (5 pages), 2017.
Cohen, Yoav, "Introducing Universal Masking", satori, (7 pages), Nov. 11, 2020, Retrieved online at https://blog.satoricyber.com/introducing-universal-masking/.
Non-Final Rejection Mailed on May 28, 2024 for U.S. Appl. No. 18/365,485, 9 page(s).
Non-Final Rejection Mailed on Sep. 28, 2024 for U.S. Appl. No. 18/462,846, 12 page(s).
Final Rejection Mailed on Oct. 31, 2024 for U.S. Appl. No. 18/365,485, 10 page(s).

\* cited by examiner

DYNAMICALLY TAILORED TIME INTERVALS FOR FEDERATED QUERY SYSTEM

BACKGROUND

Various embodiments of the present disclosure address technical challenges related to federated query processing techniques given limitations of existing federated query engines. Resolving federated queries is time consuming and resource intensive. Conventional federated query engines generate result datasets by repeatedly pulling data segments from disparate remote data sources to resolve a complex federated query. The time and processing power expended to generate a particular result set may depend on the remote data source and the complexity of the federated query. Traditional query technologies may include local caching mechanisms that may temporally store queried result sets to optimize the time and processing power expended to receive the result sets. These caches may have time to live (TTL) parameters and/or refresh rates to ensure that the cached information is up-to-date and relevant for a particular task. Traditionally, such time intervals are preset or tailored to easily identifiable information. However, federated queries are complex data structures that are not easily identifiable. Moreover, multiple federated queries may result in the same result set, which may lead to redundant caches that store the same or similar sets of data. These factors, among others, limit the efficacy of local caches for federated query engines and prevent the generation of TTL parameters and/or refresh rates that are dynamically tied to complex result sets corresponding to a federated query. Various embodiments of the present disclosure make important contributions to various existing federated query engines by addressing these technical challenges.

BRIEF SUMMARY

Various embodiments of the present disclosure provide federated query processing techniques that leverage unique hashes to identify and disambiguate between multiple federated queries processed by a federated query engine. To do so, a federated query may be processed to create an execution plan with a plurality of executable tasks. The executable tasks may be converted to task strings that may be refined to remove non-universal features. The refined task strings may be individually hashed to create a sequence of task-specific hashes, or result set hash, that are representative of a result set generated by resolving the federated query. The result set hash may be compared against historical result set hashes to determine whether the result set that will be obtained after resolving the federated query is unique. By doing so, some embodiments of the present disclosure enable the reliable identification of similar federated queries; thereby, allowing for the tailoring of result set caches to the individual characteristics of unique federated queries. In this manner, some embodiments of the present disclosure provide improved query processing techniques to overcome the technical challenges of conventional federated query engines.

In some embodiments, a computer-implemented method includes receiving, by one or more processors, an execution plan for executing a federated query, wherein the execution plan comprises a plurality of executable tasks for generating a result set from a plurality of third-party data sources; generating, by the one or more processors, a result set hash for the result set based on the execution plan, wherein the result set hash comprises a sequence of task-specific hashes corresponding to the plurality of executable tasks; determining, by the one or more processors, a query uniqueness status for the federated query based on a comparison between the result set hash and a plurality of historical result set hashes, wherein the query uniqueness status is indicative of a unique federated query or a non-unique federated query; and in response to determining that the federated query is a unique query, generating, by the one or more processors, a time interval for an intermediary local data source corresponding to the result set.

In some embodiments, a computing apparatus includes a memory and one or more processors communicatively coupled to the memory. The one or more processors are configured to: receive an execution plan for executing a federated query, wherein the execution plan comprises a plurality of executable tasks for generating a result set from a plurality of third-party data sources; generate a result set hash for the result set based on the execution plan, wherein the result set hash comprises a sequence of task-specific hashes corresponding to the plurality of executable tasks; determine a query uniqueness status for the federated query based on a comparison between the result set hash and a plurality of historical result set hashes, wherein the query uniqueness status is indicative of a unique federated query or a non-unique federated query; and in response to determining that the federated query is a unique query, generate a time interval for an intermediary local data source corresponding to the result set.

In some embodiments, one or more non-transitory computer-readable storage media include instructions that, when executed by one or more processors, cause the one or more processors to: receive an execution plan for executing a federated query, wherein the execution plan comprises a plurality of executable tasks for generating a result set from a plurality of third-party data sources; generate a result set hash for the result set based on the execution plan, wherein the result set hash comprises a sequence of task-specific hashes corresponding to the plurality of executable tasks; determine a query uniqueness status for the federated query based on a comparison between the result set hash and a plurality of historical result set hashes, wherein the query uniqueness status is indicative of a unique federated query or a non-unique federated query; and in response to determining that the federated query is a unique query, generate a time interval for an intermediary local data source corresponding to the result set.

DETAILED DESCRIPTION

Figure 1:
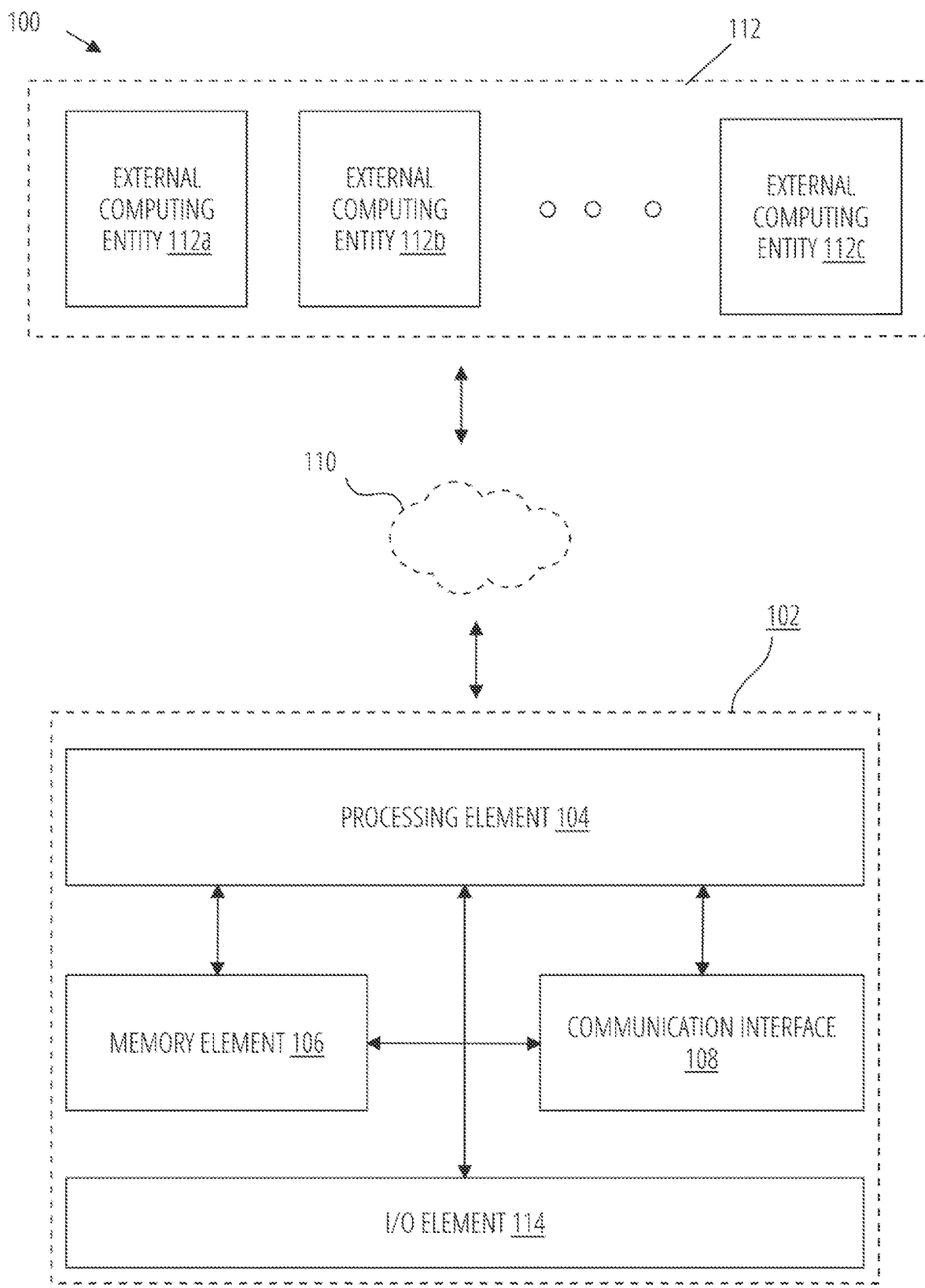
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., federated query processing techniques, optimization techniques, and/or the like) described herein.

The external computing entities 112a-c, for example, may include and/or be associated with one or more third-party data sources that may be configured to receive, store, manage, and/or facilitate a data catalog that is accessible to the predictive computing entity 102. By way of example, the predictive computing entity 102 may include a federated query system that is configured to access data segments from across one or more of the external computing entities 112a-c to resolve a complex, federated query. The external computing entities 112a-c, for example, may be associated with one or more data repositories, cloud platforms, compute nodes, and/or the like, that may be individually and/or collectively leveraged by the predictive computing entity 102 to resolve a federated query.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
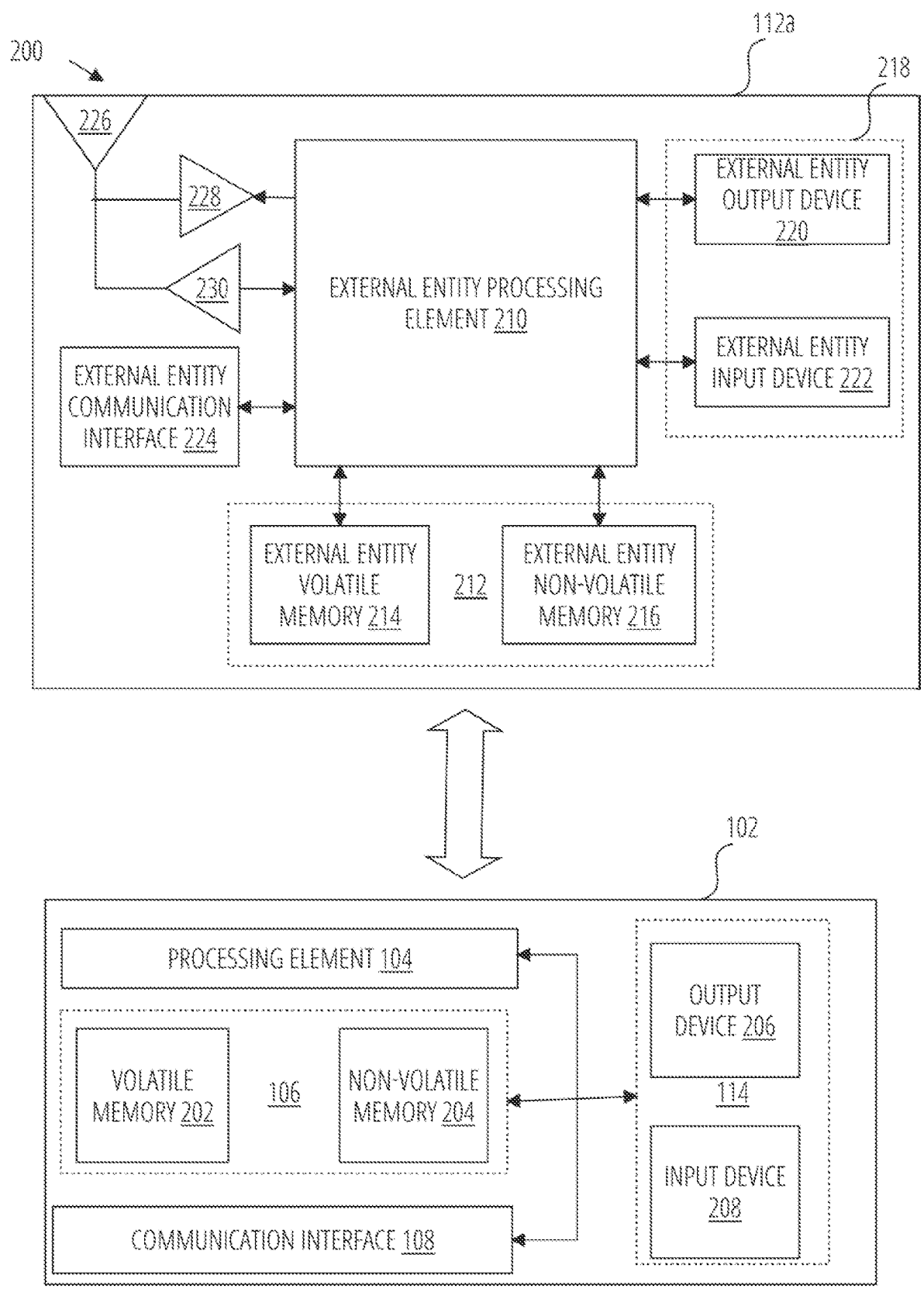
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time coordinated (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD), Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "first-party" refers to a computing entity that is associated with a query-based action. The first-party may include a computing system, platform, and/or device that is configured to initiate a query to one or more third-party data sources. For example, the first-party may include first-party platform that is configured to leverage data from one or more disparate data sources to perform a computing action. The first-party platform may include a machine learning processing platform configured to facilitate the performance of one or machine learning models, a data processing platform configured to process, monitor, and/or aggregate large datasets, and/or the like. To improve computing efficiency and enable the aggregation of data across multiple disparate datasets, the first-party may generate federated queries that reference datasets from multiple third-parties and submit the federated queries to one intermediary query processing service configured to efficiently receive the queried data from the third-parties and return the data to the first-party. In some examples, the first-party may have access to a query routine set (e.g., software development kit (SDK), etc.) that may be leveraged to wrap a query submission, acknowledgment, status polling, and result fetching application programming interfaces (APIs) to deliver a synchronous experience between the first-party and the intermediary query processing service.

In some embodiments, the term "third-party data source" refers to a data storage entity configured to store, maintain, and/or monitor a data catalog. A third-party data source may include a heterogenous data store that is configured to store a data catalog using specific database technologies, such as Netezza, Teradata, and/or the like. A data store, for example, may include a data repository, such a database, and/or the like, for persistently storing and managing collections of structured and/or unstructured data (e.g., catalogs, etc.). A third-party data source may include an on-prem data store including one or more locally curated data catalogs. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalog that, in some use cases, may include data segments that could be aggregated to perform a computing task.

In some embodiments, the term "federated query system" refers to a computing entity that is configured to perform an intermediary query processing service between a first-party and a plurality third-party data sources. The federated query system may define a single point of consumption for a first-party. The federated query system may leverage a federated query engine to enable analytics by querying data where is it is maintained (e.g., third-party data sources, etc.), rather than building complex extract, transform, and load (ETL) pipelines.

In some embodiments, the term "federated query" refers to a data entity that represents a query to a plurality of disparate, third-party data sources. The federated query may include a logical query statement that defines a plurality of query operations for receiving and processing data from multiple, different, third-party data sources.

In some embodiments, the term "result set" refers to a data entity that represents a result generated by resolving a federated query. A result set may include a dataset that includes information aggregated from one or more third-party data sources in accordance with a federated query. For example, the result set may include one or more data segments, such as one or more columns, tables, and/or the like, from one or more third-party data sources. The data segments may be joined, aggregated, and/or otherwise processed to generate a particular result set.

In some embodiments, the term "data segment" refers to a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some embodiments, the term "syntax tree" refers a data entity that represents a parsed federated query. A syntax tree may include a tree data structure, such as directed acyclic graph (DAG), and/or the like, that includes a plurality of nodes and a plurality of edges connecting one or more of the plurality of nodes. Each of the plurality of nodes may correspond to a query operation for executing a federated query. The plurality of edges may define a sequence for executing each query operation represented by the plurality of nodes. By way of example, a federated query may be parsed to extract a plurality of interdependent query operations from a federated query. The plurality of interdependent query operations may include computing functions that may rely on an input from a previous computing function and/or provide an input to a subsequent computing function. As one example, a first, data scan, function may be performed to retrieve a data segment before a second, data join, function is performed using the data segment. The syntax tree may include a plurality of nodes and/or edges that define the query operations (e.g., the nodes) and the relationships (e.g., the edges) between each of the query operations of a federated query.

In some embodiments, the term "query operation" refers a data entity that represents a portion of a federated query. A query operation may include data expression, such a structured query language (SQL) expression, that may represent a primitive computing task for executing a portion of a federated query. A query operation, for example, may include a search/scan operation for receiving data from a third-party data source, a join operation for joining two data segments, and/or the like.

In some embodiments, the term "execution plan" refers to a data entity that represents an optimized plan for executing a federated query. The execution plan, for example, may include a plurality of executable tasks for generating a result set from a plurality of third-party data sources. The execution plan may be generated by a federated query engine in accordance with an execution strategy. The execution strategy may be designed to optimize the resolution of a federated query by breaking the federated query into a plurality of serializable units of work (e.g., compute tasks) that may be distributed among one or more compute nodes.

In some examples, a federated query is converted to a syntax tree to define each of the query operations of the federated query and the relationships therebetween. The syntax tree may be converted to a logical plan in the form of hierarchical nodes that denote the flow of input from various sub-nodes. The logical plan may be optimized using one or more optimization techniques, to generate an execution plan in accordance with an execution strategy. The optimization techniques may include any type of optimization function including, as examples, Predicate and Limit pushdown, Column-Pruning, Join re-ordering, Parallelization, and/or other cost-based optimization techniques. The portions (e.g., executable tasks) of the execution plan may be scheduled across distinct compute nodes to be performed in parallel to generate intermediate result sets. Each compute node, for example, may individually connect to one or more third-party data sources to execute at least one executable task of the execution plan. The execution of each executable task may generate intermediate results. The intermediate results from each executable task may be transferred to one compute node to generate a result set.

In some embodiments, the term "executable task" refers to a data entity that represents a portion of an execution plan. An executable task may represent a unit of work for a compute node to perform a portion of a federated query. By way of example, an executable task may include one or more query operations for performing a portion of the federated query.

In some embodiments, the term "task string" refers to a data entity that represents an executable task. For example, the task string may include a string representation of an executable task. For instance, the task string may include a plurality of characters, numerals, symbols, and/or the like, that describe one or more query operations, third-party data sources, compute nodes, and/or any other characteristics or parameters of an executable task.

In some embodiments, the term "arbitrary string portion" refers to a data entity that represents a redundant portion of a task string. For example, the arbitrary string portion may be indicative of a redundant portion of the executable task that may not be used to generate an intermediate result set. For instance, a executable task may include one or more portions that are unique to a particular first party, such as an alias for a dataset, a user defined namespace, a project code, and/or the like. While these portions may be included in a federated query, they may not be used to execute a particular executable task to generate an intermediate result set for the federated query. In some examples, the task string may be parsed to identify arbitrary string portions and remove the arbitrary string portions to generate a refined task string. By way of example, the task string may be parsed using a refinement model, such as one or more natural language models, machine learning models, and/or the like, to identify the arbitrary string portions. In some examples, the model may be based on historical federated queries.

In some embodiments, the term "refined task string" refers to a data entity that represents one or more non-arbitrary portions of a task string. For example, the refined task string may include a task string with one or more arbitrary portions removed. The refined task string may represent an executable task that is stripped of all user input and/or other metadata that may be specific to a particular query but not reflective of the intention behind the query.

In some embodiments, the term "result set hash" refers to a unique identifier for a result set. In some examples, the result set hash may include a random hashed value for uniquely identifying a result set generated by resolving a federated query. The result set hash may be generated by applying a hashing function to at least a portion of the execution plan for resolving the federated query. In some examples, the result set hash may include a sequence of hash values. The sequence of hash values, for example, may correspond to a plurality of executable tasks of the execution plan. By way of example, the sequence of hash values may include a task-specific hash corresponding to each executable task of the execution plan.

In some embodiments, the term "task-specific hash" refers to a unique identifier corresponding to a portion of a federated query. For example, a task-specific hash may include a random hashed value for uniquely identifying an executable task of an execution plan. In some examples, a task-specific hash may be generated by applying the hashing function to a particular executable task. By way of example, the task-specific hash may be generated by applying the hashing function to a task string, a refined task string, and/or the like.

In some embodiments, the term "hashing function" refers to a data entity that describes parameters, hyper-parameters, and/or defined operations of an algorithm configured to generate a hashed value from an unhashed value. The hashing function may include any type of hashing algorithm, such as MD5, SHA-1, SHA-2, SHA-3, among others. The hashing function may be applied to any data entity, such as an execution plan, executable task, task string, refined task string, and/or any other representation of a federate query to generate a unique hashed identifier for the federated query and/or result set related thereto.

In some embodiments, the term "hash combination sequence" refers to a sequence of one or more task-specific hashes. In some examples, a result set hash may be represented by one or more different hash combination sequences. For example, a result set hash may be order agnostic, such that each hash combination sequence may represent the same result set.

In some embodiments, the term "historical result set hash" refers to a data entity that represents a previously resolved federated query. A historical result set hash may include a hash combination sequence corresponding to a recently executed federated query In some examples, the historical result set hash may include a result set hash for a federated query that has been resolved within a threshold time period. The threshold time period may be based on an intermediate local data source. For example, the historical result set hash may represent a result set that is stored in an intermediary local data source. In some examples, a plurality of historical result set hashes may be stored in a local state lookup table that identifies each result set maintained within an intermediary local data source.

In some embodiments, the term "intermediary local data source" refers to a data storage entity configured to store, maintain, and/or monitor portions of one or more third-party data sources. An intermediary local data source may include a local data store, such a local cache, and/or the like, that is configured to temporarily store one or more result sets from one or more federates queries. By way of example, the intermediary local data source may include one or more cache memories, each configured store and/or maintain a result dataset for a temporary time duration. In some examples, the intermediary local data source may be configured with one or more time intervals that specify a refresh rate, time-to-live, and/or the like for data stored within the intermediary local data source.

In some embodiments, the term "time interval" refers to a data entity that represents a timing parameter for an intermediary local data source. In some examples, the time interval may include a refresh rate for the intermediary local data source. In some examples, the time interval may include a time-to-live parameter for an intermediary local data source. In some examples, the time interval may be dynamically determined based on the result set stored within the intermediary local data source. In some examples, the time interval may be dynamically determined based on the federated query corresponding to the result set.

In some embodiments, the term "local state lookup table" refers to a data entity that represents one or more historical federated queries. By way of example, the local state lookup table may include a list of previously executed federated queries, active result sets, time intervals for the active result sets, query counts for the federated queries, and/or the like.

In some embodiments, the term "query uniqueness status" refers to a data parameter that indicates whether a federated query that results in a particular result set is unique. For example, the query uniqueness status may be indicative of a unique federated query or a non-unique federated query. A federated query may be a non-unique federated query in the event that the same or similar federated query was previously executed and resulted in result set that matches the particularly result set. In some examples, the query uniqueness status may be based on the local state lookup table. For example, the query uniqueness status may indicate that a federated query is not unique in the event that a result set hash corresponding to the federated query matches a historical result set hash of the local state lookup table. In addition, or alternatively, the query uniqueness status may indicate that a federated query is unique in the event that the result set hash corresponding to the federated query does not match a historical result set hash of the local state lookup table.

In some examples, the query uniqueness status may indicate whether a federated query should be resolved to obtain a result set. For example, in the event the that federated query is not unique, a result set for the federated query may already be stored in an intermediary local data source. In such a case, the result set may be obtained from the intermediary local data source instead of executing the federated query. As another example, in the event the that federated query is unique, a result set for the federated query may not be stored in an intermediary local data source. In such a case, the result set may be generated by resolving the federated query.

In some embodiments, the term "result set parameter" refers to a data entity that describes a characteristic of a result set and/or federated query. A result set parameter may include any of a plurality of different result set parameters that describe an attribute of a result set and/or federated query.

In some examples, a result set parameter may be indicative of a historical access frequency for the result set. The historical access frequency may be indicative of one or more access patterns for the result set and/or one or more portions of the result set. By way of example, the historical access frequency may be indicative of a query count for the result set. The query count for the result set may be indicative of a number of federated queries corresponding to the result set over a period of time. The query count, for example, may be determined based on a comparison between a result set hash to a plurality of historical result set hashes. In addition, or alternatively, the historical access frequency may be indicative of a query count for a portion (e.g., a data segment, etc.) of the result set. For example, the historical access frequency may include a respective query count for one or more data segments of a result set.

In some examples, a result set parameter may be indicative of a query complexity for resolving a corresponding federated query. A query complexity may be based on a syntax tree, one or more query operations, an execution plan, one or more executable tasks, and/or the like. For example, the query complexity may be based on one or more historical executable times or processing resource requirements for executing one or more portions (e.g., query operations, executable tasks, etc.) of a federated query. In some examples, the query complexity may be based one or more third-party data sources associated with a federated query. For example, the query complexity may be based on one or more access rates, access latencies, and/or the like for the third-party data sources.

In some examples, a result set parameter may include a data staleness threshold for the result set. A data staleness threshold may be indicative of a desired data refresh rate for a result set and/or portion thereof to ensure that the result set reflects reality and is relevant for a first-party configured to leverage the result set. A data staleness threshold may include a data producer threshold corresponding to at least one of the plurality of third-party data sources. For example, the data staleness threshold may be based on a refresh rate of data stored by a third-party data source. In addition, or alternatively, the data staleness threshold may include a data consumer threshold corresponding to the first-party that initiated the federated query. For example, the data staleness threshold may be based on an execution frequency, one or more data integrity requirements, and/or the like, of an application configured to leverage the result set.

In some embodiments, the term "interval model" refers to a data entity that describes parameters, hyper-parameters, and/or defined operations of a machine learning model (e.g., model including at least one of one or more rule-based layers, one or more layers that depend on trained parameters, coefficients, and/or the like), and/or the like. The interval model may be configured to generate an optimized time interval for an intermediary local data source based on one or more result set parameters. The interval model may include one or more of any type of machine learning model including one or more supervised, unsupervised, semi-supervised, reinforcement learning models, and/or the like. In some examples, the interval model may include multiple models configured to perform one or more different stages of an optimization process.

In some embodiments, the term "refinement model" refers to a data entity that describes parameters, hyper-parameters, and/or defined operations of a rules-based model, machine learning model (e.g., model including at least one of one or more rule-based layers, one or more layers that depend on trained parameters, coefficients, etc.), and/or the like. The refinement model may be configured to generate a refined task string for an executable task based on a corresponding task string. To do so, the refinement model may be configured to identify and/or remove one or more arbitrary string portions from the task string. The refinement model may include one or more of any type of machine learning model including one or more supervised, unsupervised, semi-supervised, reinforcement learning models, and/or the like. As one example, the refinement model may include a natural language processor trained to identify arbitrary string portions from natural language and/or structured text forming a task string. The refinement model may include any type of natural language processor including, as examples, support vector machines, Bayesian networks, maximum entropies, conditional random fields, neural networks, transformers and/or the like. In some examples, the machine learning model may include multiple models configured to perform one or more different stages of a refinement process.

IV. OVERVIEW, TECHNICAL IMPROVEMENTS, AND TECHNICAL ADVANTAGES

Embodiments of the present disclosure present federated query processing techniques that improve traditional federated query engines by identifying and intelligently handling unique federated queries across a plurality of disparate data sources. The federated query processing techniques may be leveraged to identify similar federated queries for tracking whether a received federated query has previously been executed. By identifying such queries, some embodiments of the present disclosure may improve the allocation and use of computing resources by tailoring intermediary local data sources to the characteristics of unique federated queries. For example, using some of the techniques of the present disclosure, unique queries may be executed and stored in a local cache, while non-unique queries may be identified and used to retrieve an already cached result set. In this manner, some embodiments of the present disclosure conserve computing resources by eliminating redundant query execution and storage of duplicative result sets.

Some techniques of the present disclosure facilitate the reliable identification of complex federated queries using unique hashed identifiers. To do so, some embodiments of the present disclosure describe a result set hash that is generated by hashing string representations of an execution plan for resolving a federated query. New machine learning model techniques may be leveraged to remove redundant, non-universal, information from the string representations to generate refined string representations. The refined string representations may be hashed to generate identifiers that are universally comparable across a plurality of different query sources. In this manner, the hashed identifiers of the present disclosure may be universally compared against various federated queries from different sources to identify matches between traditionally incompatible and complex queries.

Some techniques of the present disclosure facilitate the dynamic generation of parameters for intermediary local data sources, such as local cache memories, based on the identification of a unique federated query. By limiting this analysis to unique federated queries, some of the techniques of the present disclosure may allow for the use of additional computing resources for optimizing such parameters without degrading the overall performance of a federated query engine. The parameters may include time intervals, such as refresh rates, TTL parameters, and/or the like, that may be tailored to the specific characteristics of a federated query. A new machine learning model is disclosed that may be trained to optimize the time intervals for intermediary local data sources based on the specific characteristics of a federated query including, as examples, historical access frequencies for a result set of the query, query complexity for the federated query, data staleness thresholds for the result set, and/or the like. In this manner, the parameters of each intermediary local data source of a federated query system may be individually tailored to the data stored within source, which may improve data integrity and use patterns of computing resources over traditional federated query systems.

Example inventive and technologically advantageous embodiments of the present disclosure include: (i) hashing techniques for identifying unique federated queries; (ii) machine learning techniques for refining task strings; (iii) machine learning techniques for optimizing local data source parameters, (iv) caching techniques for intelligently caching result sets of a federated query system, among others.

V. EXAMPLE SYSTEM OPERATIONS

As indicated, various embodiments of the present disclosure make important technical contributions to federated query processing technology. In particular, systems and methods are disclosed herein that implement federated query processing techniques for tracking, monitoring, and handling unique federated queries and/or result sets. Unlike traditional query techniques, the query processing techniques of the present disclosure leverage execution plans and hashing techniques generate new result set hashes for uniquely identifying and comparing federated queries based on the query intent.

Figure 3:
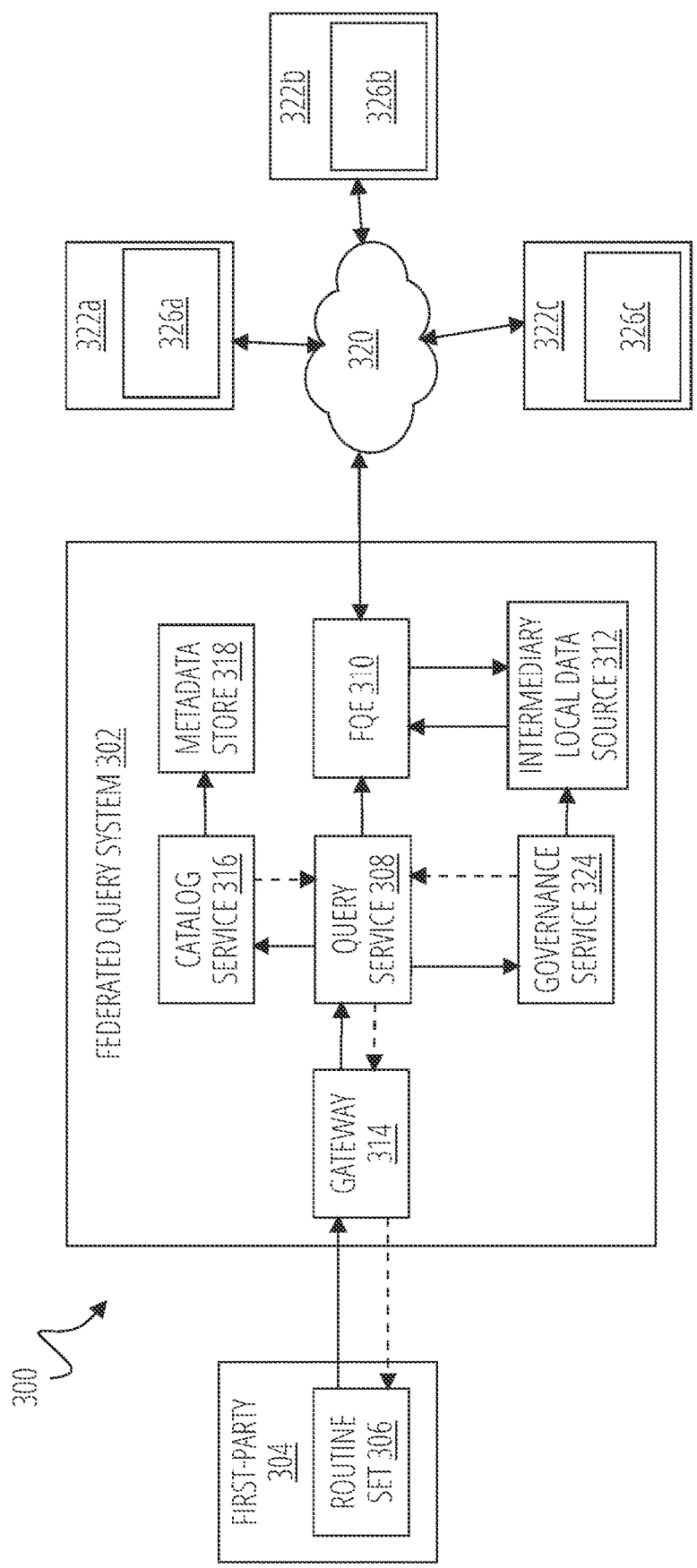
FIG. 3 is a system diagram showing example computing entities for facilitating a federated query service in accordance with some embodiments discussed herein.

FIG. 3 is a system diagram 300 showing example computing entities for facilitating a federated query service in accordance with some embodiments discussed herein. The system diagram 300 includes a first-party 304, a federated query system 302, and a plurality of third-party data sources 322a-c. The federated query system 302 may be configured to facilitate a plurality of computing functionalities to provide a seamless experience for the first-party 304, such as a data analytics and/or science user, to query and analyze data across the plurality of third-party data sources 322a-c without the need make duplicate copies of the data. Using some of the techniques of the present disclosure, the federated query system 302 optimizes data store coverage, speed of analytics, and correctness of data to provide a near real time experience for all analytical use cases.

In some embodiments, the federated query system 302 is a computing entity that is configured to perform an intermediary query processing service between the first-party 304 and the plurality of third-party data sources 322a-c. The federated query system 302 may define a single point of consumption for a first-party 304. The federated query system 302 may leverage a federated query engine to enable analytics by querying data where is it is maintained (e.g., third-party data sources, etc.), rather than building complex ETL pipelines.

In some embodiments, the first-party 304 accesses the federated query system 302 to initiate a federate query to one or more of the plurality of third-party data sources 322a-c. For example, the first-party 304 may leverage a routine set 306 for the federated query system 302 to submit a federated query to the federated query system 302. The federated query system 302 may include an application programming interface (API) gateway 314 for securely receiving the federated query. The gateway 314 may verify and/or route the federated query to the query service 308.

In some embodiments, the first-party 304 is a computing entity that is associated with a query-based action. The first-party may include a computing system, platform, and/or device that is configured to initiate a query to one or more of the plurality of third-party data sources 322a-c. For example, the first-party 304 may include a first-party platform that is configured to leverage data from one or more disparate data sources to perform a computing action. The first-party platform may include a machine learning processing platform configured to facilitate the performance of one or machine learning models, a data processing platform configured to process, monitor, and/or aggregate large datasets, and/or the like.

To improve computing efficiency and enable the aggregation of data across multiple disparate datasets, the first-party 304 may generate a federated query that reference datasets from multiple third-parties and submit the federated query to one intermediary query processing service (e.g., federated query system 302) configured to efficiently receive the queried data from the third-parties and return the data to the first-party 304. In some examples, the first-party 304 may have access to a query routine set (e.g., software development kit (SDK), etc.) that may be leveraged to wrap a query submission, acknowledgment, status polling, and/or result fetching APIs to deliver a synchronous experience between the first-party 304 and the intermediary query processing service.

In some embodiments, a federated query is a data entity that represents a query to a plurality of third-party data sources 322a-c. The federated query may include a logical query statement that defines a plurality of query operations for receiving and processing data from multiple, different, third-party data sources 322a-c. In some examples, the federated query may be generated using one or more query functionalities of the routine set 306.

In some embodiments, a query operation is a data entity that represents a portion of a federated query. A query operation may include data expression, such a structured query language (SQL) expression, that may represent a primitive computing task for executing a portion of a federated query. A query operation, for example, may include a search/scan operation for receiving data from a third-party data source, a join operation for joining two data segments, and/or the like.

In some embodiments, a third-party data source is a data storage entity configured to store, maintain, and/or monitor a data catalogue. A third-party data source may include a heterogenous data store that is configured to store a data catalogue using specific database technologies, such as Netezza, Teradata, and/or the like. A data store, for example, may include a data repository, such a database, and/or the like, for persistently storing and managing collections of structured and/or unstructured data (e.g., catalogues, etc.). A third-party data source may include an on-premise data store including one or more locally curated data catalogues. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalogue that, in some use cases, may include data segments that could be aggregated to perform a computing task.

By way of example, the federated query system 302 may be associated with a plurality of third-party data sources 322a-c that may include a first third-party data source 322a, a second third-party data source 326b, a third third-party data source 322c, and/or the like. Each of the plurality of third-party data sources 322a-c may include a standalone, incompatible, data sources. The first third-party data source 322a, for example, may include a first third-party dataset 326a that is separate from a second third-party data source 326b and/or a third third-party dataset 326c of the second third-party data source 322b and third third-party data source 322c, respectively. Each of the plurality of third-party data sources 322a-c may include any type of data source. As an example, the first third-party data sources 322a may include a first cloud-based dataset, the second third-party data source 322b may include an on-premises dataset, the third third-party data source 322c may include a second cloud-based dataset, and/or the like.

In some embodiments, the query service 308 receives a federated query from the first-party 304 through the gateway 314. The query service 308 may perform one or more operations to facilitate the optimal generation of a result set in response to the federated query. To do so, the query service 308 may leverage one or more sub-components of the federated query system 302. The one or more sub-components may include the federated query engine 310, the catalog service 316, the governance service 324, the intermediary local data source 312, the metadata store 318, and/or the like.

In some embodiments, the federated query engine 310 is a computing entity that is configured to execute federated query across heterogenous data store technologies. The federated query engine 310 may be configured to implement an execution strategy to generate an optimal execution plan for a federated query. The execution plan may define a sequence of operations, a timing for the sequence of operations, and/or other contextual information for optimally executing a complex federated query. The federated query engine 310, may leverage optimization techniques, such as Predicate and Limit pushdown, Column-Pruning, Join reordering, Parallelization, and/or other cost-based optimization techniques to arrive at an execution strategy of the joins, aggregations, and/or the like.

The federated query engine 310 may be configured to leverage a massively parallel processing (MPP) architecture to simultaneously execute multiple portions of a federated query to optimize computing performance. For example, the federated query engine 310 may schedule one or more portions of the execution plan for execution across one or more distinct compute nodes which then connect to the plurality of third-party data sources 322a-c to execute parts of splits of the execution plan on the plurality of third-party data sources 322a-c. In this manner, a result set may be generated across multiple compute nodes and then transferred back to the executor (worker) nodes which processes intermediate results.

In some embodiments, the catalog service 316 is a computing entity that is configured to identify a mapping between a data segment and a third-party data source. For example, the catalog service 316 may maintain a table name path for each data table associated with (e.g., registered with, etc.) the federated query system 302. By way of example, the plurality of third-party data sources 322a-c may be previously registered with the federated query system 302. During registration, the catalog service 316 may be modified to include a mapping to each data table of a respective data catalog of a third-party data source. The mapping may include a table name path that identifies a path for accessing a particular table of a third-party data source.

In some embodiments, a table name path is a data entity that represents a qualifiable table name for a data table. A table name path, for example, may identify a third-party data source, a schema, and/or a table name for the data table. The table name may include a third-party defined name. In some examples, the table name may correspond to one or more table name aliases defined by the third-party and/or one or more other entities. The catalog service 316 may record the table name path, the table name, and/or any table name aliases for a respective data table.

In some examples, the mapping for a respective data table may be modifiable to redirect a request to a data table. For instance, the catalog service 316 may be configured to communicate with the plurality of third-party data sources 322a-c to maintain a current mapping for each data table of the plurality of third-party data sources 322a-c. In addition, or alternatively, the catalog service 316 may interact with the query service 308 to redirect a request to a data table, and/or portion thereof, to an intermediary local data source as described herein.

In some embodiments, the catalog service 316 maintains a metadata store 318 that includes metadata for each of the plurality of third-party data sources 322a-c. The metadata store 318 may be populated for each of the plurality of third-party data sources 322a-c during registration. The metadata may include access parameters (e.g., security credentials, data access controls, etc.), performance attributes (e g, historical latency, data quality, etc.), access trends, and/or the like for each of the plurality of third-party data sources 322a-c.

In some examples, the catalog service 316 may maintain a current state for a federated query system 302. The current state may be indicative of a plurality of historical result set hashes corresponding to a plurality of recently resolved federated queries and/or one or more query counts for each of the historical result set hashes. In some examples, the plurality of historical result set hashes may identify one or more locally stored result sets that are currently stored in one or more intermediary local data sources 312.

In some embodiments, the federated query system 302 includes a governance service 324 configured to manage access to the intermediary local data source 312. The governance service 324, for example, may include a computing entity that is configured to authorize and/or audit access to one or more local and/or remote data assets. The governance service 324 may define governance criteria for data classification, usage rights, and/or access controls to intermediary local data source 312 and/or the plurality of third-party data sources 322a-c.

In some embodiments, the intermediary local data source 312 refers to a data storage entity configured to store, maintain, and/or monitor portions of the plurality of third-party data sources 322a-c. An intermediary local data source 312 may include a local data store, such a local cache, and/or the like, that is configured to temporarily store one or more data segments from one or more of the plurality of third-party data sources 322a-c. By way of example, the intermediary local data source 312 may include one or more cache memories, each configured store and/or maintain a data segment and/or a result dataset for a temporary time duration. In some examples, the intermediary local data source 312 may be leveraged with one or more optimization techniques of the present disclosure to intelligently retrieve and store result sets for unique federated queries.

Is some embodiments, the query service 308 is configured to facilitate a dynamic caching scheme for intelligently caching result sets from unique federated queries within the intermediary local data source 312. An example of a dynamic caching scheme will now further be described with reference to FIG. 4.

Figure 4:
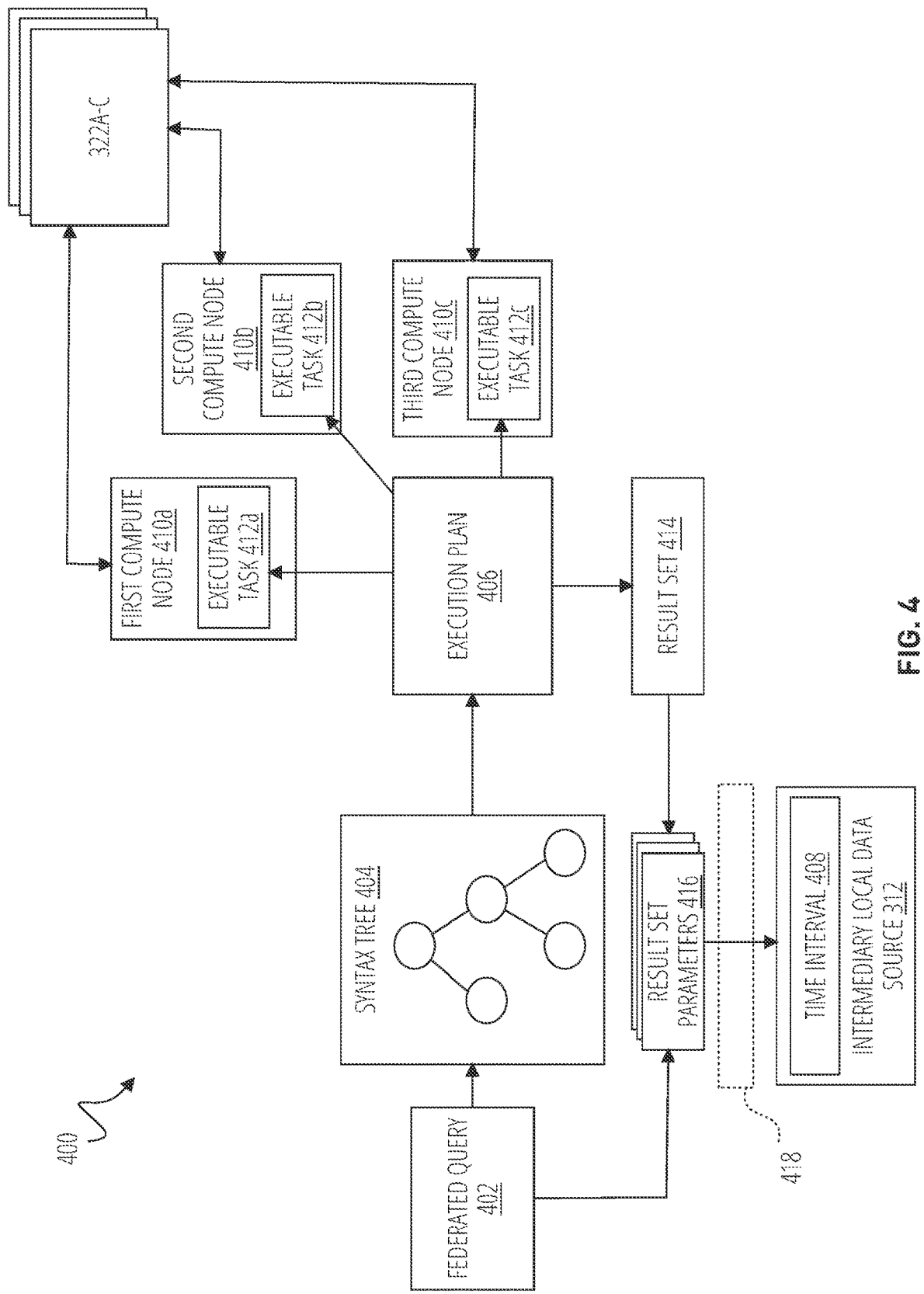
FIG. 4 is a dataflow diagram showing example data structures for generating dynamically tailored time intervals for intermediate local data sources in accordance with some embodiments discussed herein.

FIG. 4 is a dataflow diagram 400 showing example data structures for generating dynamically tailored time intervals for intermediate local data sources in accordance with some embodiments discussed herein. The dataflow diagram 400 depicts a set of data structures and computing entities for optimally resolving a federated query across a plurality of third-party data sources 322a-c using an execution plan 406 with a plurality of parallelizable executable tasks 412a-c.

In some embodiments, a federated query 402 is received that references a plurality of data segments from one or more of the plurality of third-party data sources 322a-c. For example, each of the data segments may be referenced by one or more query operations of the federated query 402.

In some embodiments, a data segment is a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some embodiments, the federated query 402 is resolved to generate a result set 414. In some embodiments, the result set 414 is a data entity that represents a result generated by resolving a federated query 402. A result set 414 may include a dataset that includes information aggregated from one or more of a plurality of third-party data sources 322a-c in accordance with a federated query 402. For example, the result set 414 may include one or more data segments, such as one or more columns, tables, and/or the like, from one or more of the third-party data sources 322a-c. The data segments may be joined, aggregated, and/or otherwise processed to generate a particular result set.

The federated query 402 may be optimally resolved in accordance with an execution plan 406 for the federated query 402. In some examples, the execution plan 406 may be generated based on a syntax tree 404 for the federated query 402. In addition, or alternatively, the execution plan 406 may be received from a federated query engine. For example, a query service may receive the federated query 402 and provide the federated query 402 to the federated query engine for processing. The federated query engine may, in response to the federated query 402, generate the execution plan 406 in accordance with an optimized execution strategy and provide the execution plan 406 for the federated query 402 to the query service.

In some embodiments, the execution plan 406 is a data entity that represents an optimized plan for executing a federated query 402. The execution plan, for example, may include a plurality of executable tasks 412a-c for generating a result set 414 from a plurality of third-party data sources 322a-c. The execution plan 406 may be generated by a federated query engine in accordance with an execution strategy. The execution strategy may be designed to optimize the resolution of a federated query 402 by breaking the federated query 402 into a plurality of serializable units of work (e.g., executable tasks 412a-c) that may be distributed among one or more compute nodes 410a-c.

In some embodiments, the federated query 402 is converted to a syntax tree 404 to define each of the query operations of the federated query 402 and the relationships therebetween.

In some embodiments, the syntax tree 404 is a data entity that represents a parsed federated query. The syntax tree 404 may include a tree data structure, such as directed acyclic graph (DAG), and/or the like, that includes a plurality of nodes and a plurality of edges connecting one or more of the plurality of nodes. Each of the plurality of nodes may correspond to a query operation for executing at least a portion of the federated query 402. The plurality of edges may define a sequence for executing each query operation represented by the plurality of nodes. By way of example, the federated query 402 may be parsed to extract a plurality of interdependent query operations from the federated query 402. The plurality of interdependent query operations may include computing functions that may rely on an input from a previous computing function and/or provide an input to a subsequent computing function. As one example, a first, data scan, function may be performed to retrieve a data segment from a third-party data source before a second, data join, function is performed using the data segment. The syntax tree 404 may include a plurality of nodes and/or edges that define the query operations (e.g., the nodes) and the relationships (e.g., the edges) between each of the query operations of the federated query 402.

In some embodiments, the syntax tree 404 is converted to a logical plan in the form of hierarchical nodes that denote the flow of input from various sub-nodes. The logical plan may be optimized, using one or more optimization techniques, to generate an execution plan 406 in accordance with an execution strategy. The optimization techniques may include any type of optimization function including, as examples, Predicate and Limit pushdown, Column-Pruning, Join re-ordering, Parallelization, and/or other cost-based optimization techniques. The portions (e.g., executable tasks 412a-c) of the execution plan 406 may be scheduled across distinct compute nodes 410a-c to be performed in parallel to generate intermediate result sets. Each of the compute nodes 410a-c, for example, may individually connect to one or more of the plurality of third-party data sources 322a-c to execute at least one executable task of the execution plan 406. The execution of each executable task may generate intermediate results. The intermediate results from each execution task may be transferred to one compute node to generate the result set 414.

In some embodiments, an executable task is a data entity that represents a portion of an execution plan 406. An executable task may represent a unit of work for a compute node to perform a portion of a federated query 402. By way of example, an executable task may include one or more query operations for performing a portion of the federated query 402.

In some embodiments, to optimize the resolution of a federated query 402, an execution plan 406 is split into multiple independently executable tasks 412a-c. By way of example, the executable tasks 412a-c may include a first executable task 412a, a second executable task 412b, a third executable task 412c, and/or the like. Each of the executable tasks 412a-c may be individually scheduled across a plurality of compute nodes 410a-c. For example, the first executable task 412a may be scheduled for execution by a first compute node 410a, the second executable task 412b may be scheduled for execution by a second compute node 410b, the third executable task 412c may be scheduled for execution by a third compute node 410c, and/or the like.

Each of the compute nodes 410a-c may include individual processing units that may provide storage, networking, memory, and/or processing resources for performing one or more computing tasks. In some examples, the compute nodes 410a-c may simultaneously operate to execute one or more of the executable tasks 412a-c in parallel. Intermediate results from each of the compute nodes 410a-c may be aggregated to generate a result set 414.

In some embodiments, the result set 414 is temporarily stored in an intermediary local data source 312. For example, the intermediary local data source 312 corresponding to the result set 414 may be generated and/or configured to temporarily store the results. In some examples, the intermediary local data source 312 may be generated and/or configured based on a query uniqueness status as described herein. For example, the intermediary local data source 312 may be generated in response to receiving the federated query 402 to anticipate the result set 414. The intermediary local data source 312 may be generated prior to, simultaneously with, and/or after the performance of the federated query 402.

In some embodiments, the performance of the federated query 402 is initiated based on the query uniqueness status as described herein. The performance of the federated query 402 may be initiated based on the execution plan 406. The performance of the federated query 402 may generate a result set 414. In some examples, the result set 414 may be stored in the intermediary local data source 312.

In some embodiments, the intermediary local data source 312 is a data storage entity configured to store, maintain, and/or monitor portions of one or more of the plurality of third-party data sources 322a-c. An intermediary local data source 312 may include a local data store, such a local cache, and/or the like, that is configured to temporarily store one or more result sets from one or more federates queries. By way of example, the intermediary local data source 312 may include one or more cache memories, each configured store and/or maintain a result dataset for a temporary time duration. In some examples, the intermediary local data source 312 may be configured with one or more time intervals that specify a refresh rate, time-to-live, and/or the like for data stored within the intermediary local data source 312.

In some embodiments, the time interval 408 refers to a data entity that represents a timing parameter for the intermediary local data source 312. In some examples, the time interval 408 may include a refresh rate for the intermediary local data source 312. In some examples, the time interval 408 may include a time-to-live parameter for an intermediary local data source 312. In some examples, the time interval 408 may be dynamically determined based on the result set 414 stored within the intermediary local data source 312. In some examples, the time interval 408 may be dynamically determined based on the federated query 402 corresponding to the result set 414.

In some embodiments, a time interval 408 is generated for the intermediary local data source 312 based on the query uniqueness status. For example, the time interval 408 corresponding to the result set 414 may be generated in response to determining that the federated query 402 is a unique query.

In some embodiments, the time interval 408 is generated, using a using a machine learning model, based on one or more result set parameters 416. For instance, the result set parameters 416 may be received for the result set 414. The result set parameters 416 may be received in response to determining that the federated query 402 is a unique query.

In some embodiments, the result set parameters 416 are data entities that describe a characteristic of a result set 414 and/or federated query 402. A result set parameter may include any of a plurality of different result set parameters that describe an attribute of a result set 414 and/or federated query 402.

In some examples, the result set parameters 416 may be indicative of a historical access frequency for the result set 414. The historical access frequency may be indicative of one or more access patterns for the result set 414 and/or one or more portions of the result set 414. By way of example, the historical access frequency may be indicative of a query count for the result set 414. A query count may be a data entity that represents a number of historical queries associated with the federated query 402 and/or result set 414 over a time duration. For example, the query count for a result set 414 may be indicative of a number of federated queries corresponding to the result set 414 over a period of time. In some examples, the historical number of queries may be associated with a time range. The time range may include a time duration preceding a current time such that the query count is dynamically updated based on the current time. In addition, or alternatively, the time range may include a time window with particular start and end times. The start and end times may include a time of day, a day of the week, week of the month, and/or the like.

In some examples, the result set parameters 416 may be indicative of a query complexity for resolving a corresponding federated query 402. A query complexity may be based on the syntax tree 404, one or more query operations, the execution plan 406, the executable tasks 412a-c, and/or the like. For example, the query complexity may be based on one or more historical execution times or processing resource requirements for executing one or more portions (e.g., query operations, executable tasks 412a-c, etc.) of a federated query 402. In some examples, the query complexity may be based the third-party data sources 322a-c associated with a federated query 402. For example, the query complexity may be based on one or more access rates, access latencies, and/or the like for the third-party data sources 322a-c.

In some examples, the result set parameters 416 may include a data staleness threshold for the result set 414. A data staleness threshold may be indicative of a desired data refresh rate for a result set 414 and/or portion thereof to ensure that the result set 414 reflects reality and is relevant for a first-party configured to leverage the result set 414. A data staleness threshold may include a data producer threshold corresponding to at least one of the plurality of third-party data sources 322a-c. For example, the data staleness threshold may be based on a refresh rate of data stored by a third-party data source, one or more data staleness standards of the third-party data source, and/or the like. In addition, or alternatively, the data staleness threshold may include a data consumer threshold corresponding to the first-party that initiated the federated query 402. For example, the data staleness threshold may be based on an execution frequency, one or more data integrity requirements, and/or the like, of an application configured to leverage the result set 414.

In some embodiments, the time interval 408 is generated using an interval model 418 configured to output an optimized time interval for a result set 414 based on the result set parameters 416. In some embodiments, the interval model 418 is a data entity that describes parameters, hyperparameters, and/or defined operations of a machine learning model (e.g., model including at least one of one or more rule-based layers, one or more layers that depend on trained parameters, coefficients, and/or the like), and/or the like. The interval model 418 may be configured to generate an optimized time interval for an intermediary local data source 312 based on the result set parameters 416. The interval model 418 may include one or more of any type of machine learning model including one or more supervised, unsupervised, semi-supervised, reinforcement learning models, and/or the like. In some embodiments, the interval model 418 may include multiple models configured to perform one or more different stages of an optimization process. As one example, the interval model 418 may include an optimization machine learning that is trained to optimize a cost function using one or more optimization techniques. The cost function, for example, may be based on a computing performance of a federated query system such that the interval model 418 may be trained to generate time intervals for individual result sets that optimize the performance of the federated query system as a whole.

In some embodiments, the result set parameters 416 are dynamic and change over time and/or in response to one or more stimuli. For example, a historical access frequency for a result set 414 may continually change based on one or more federated queries to the result set 414. In such a case, parameter updates to the result set parameters 416 may be based on one or more subsequent federated queries to the result set 414. In some examples, parameter updates for the result set parameters 416 may be received that are representative of the one or more changes to the result set parameters 416. In some examples, the time interval 408 may be modified, using the interval model 418, based on the parameter updates. For instance, the time interval 408 may be continually updated responsive to changes to the result set parameters 416.

As described herein, in some examples, an intermediary local data source 312 and/or time interval 408 for the result set 414 may be generated in response to a determination that the federated query 402 is a unique query. Due to the complexity of federated queries, traditional federated query engines may be unable to reliable detect whether a federated query is unique. Some embodiments of the present disclosure provide improvement to traditional federated query techniques by determining a query uniqueness status for a federated query 402. An example of a uniqueness detection scheme will now further be described with reference to FIG. 5.

Figure 5:
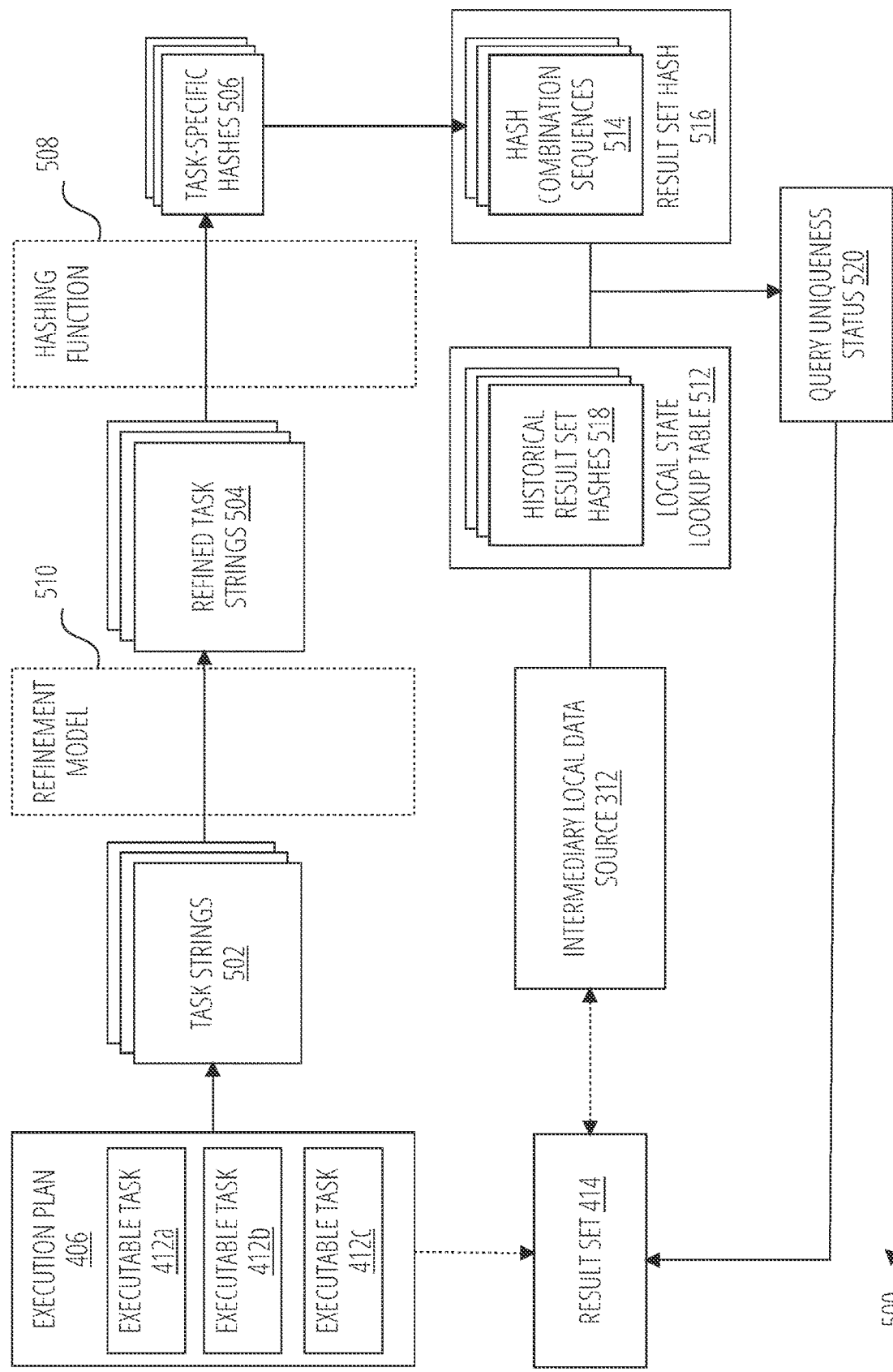
FIG. 5 is a dataflow diagram showing example data structures for determining a query uniqueness status for a federated query in accordance with some embodiments discussed herein.

FIG. 5 is a dataflow diagram showing example data structures for determining a query uniqueness status for a federated query in accordance with some embodiments discussed herein. The dataflow diagram 400 depicts a set of data structures and computing entities that are specially designed to overcome limitations of traditional federated query engines by determining a query uniqueness status 520 for a federated query 402. As described herein, an execution plan 406 may be received and/or generated for a federated query 402. The execution plan 406 may include a plurality of executable tasks 412a-c that may be processed to determine the query uniqueness status 520 of the federated query 402.

In some embodiments, the query uniqueness status 520 is determined based on a result set hash 516 for the result set 414. For example, a result set hash 516 may be generated for the result set 414 based on the execution plan 406 for resolving the federated query 402.

In some embodiments, the result set hash 516 is a unique identifier for a result set 414 and/or a corresponding federated query 402. For example, the result set hash 516 may include a random hashed value for uniquely identifying a result set 414 generated by resolving a federated query 402. The result set hash 516 may be generated by applying a hashing function 508 to at least a portion of the execution plan 406 for resolving the federated query 402. In some examples, the result set hash 516 may include a sequence of hash values. The sequence of hash values, for example, may correspond to the executable tasks 412a-c of the execution plan 406. By way of example, the sequence of hash values may include task-specific hashes 506 corresponding to the executable tasks 412a-c of the execution plan 406.

In some embodiments, the result set hash 516 is generated based on a plurality of task-specific hashes 506. In some embodiments, the task-specific hash is a unique identifier corresponding to a portion of a federated query 402. For example, a task-specific hash may include a random hashed value for uniquely identifying an executable task of the execution plan 406. In some examples, a task-specific hash may be generated by applying the hashing function 508 to a particular executable task. By way of example, the hash combination sequences 514 may be generated by applying the hashing function to a task string, a refined task string, and/or the like.

In some embodiments, a plurality of task strings 502 are generated for the executable tasks 412a-c. For example, the task strings 502 may include a respective task string for each of the executable tasks 412a-c.

In some embodiments, the task strings 502 are data entities that individually represent an executable task. For example, a task string may include a string representation of an executable task. For instance, the task string may include a plurality of characters, numerals, symbols, and/or the like, that describe one or more query operations, third-party data sources, compute nodes, and/or any other characteristics or parameters of an executable task.

In some embodiments, the task strings 502 are refined to generate a plurality of refined task strings 504 corresponding to the executable tasks 412a-c. For example, each of the task strings 502 may be refined by identifying one or more arbitrary string portions for a task string. Each of the arbitrary string portion may be indicative of a redundant portion of an executable task that is not reflective of the intent behind the executable task. A refined task string may be generated by removing the one or more arbitrary string portions from the task string.

In some embodiments, an arbitrary string portion is a data entity that represents a redundant portion of a task string. For example, the arbitrary string portion may be indicative of a redundant portion of the executable task that may not be used to generate an intermediate result set. For instance, an executable task may include one or more portions that are unique to a particular first party, such as an alias for a dataset, a user defined namespace, a project code, and/or the like. While these portions may be included in a federated query 402, they may not be used to execute a particular executable task to generate an intermediate result set for the federated query 402. In some examples, a string may be parsed to identify arbitrary string portions and remove the arbitrary string portions to generate a refined task string. By way of example, the task string may be parsed using a refinement model 510, such as one or more natural language models, machine learning models, and/or the like, to identify the arbitrary string portions. In some examples, the model may be based on historical federated queries.

In some embodiments, the refinement model 510 is a data entity that describes parameters, hyper-parameters, and/or defined operations of a rules-based model, machine learning model (e.g., model including at least one of one or more rule-based layers, one or more layers that depend on trained parameters, coefficients, and/or the like), and/or the like. The refinement model 510 may be configured to generate a refined task string for an executable task based on a corresponding task string. To do so, the refinement model 510 may be configured to identify and/or remove one or more arbitrary string portions from the task string. The refinement model 510 may include one or more of any type of machine learning model including one or more supervised, unsupervised, semi-supervised, reinforcement learning models, and/or the like. As one example, the refinement model 510 may include a natural language processor trained to identify arbitrary string portions from natural language and/or structured text forming a task string. The refinement model 510 may include any type of natural language processor including, as examples, support vector machines, Bayesian networks, maximum entropies, conditional random fields, neural networks, transformers and/or the like. In some examples, the refinement model 510 may include multiple models configured to perform one or more different stages of a refinement process.

In some embodiments, the refined task strings 504 are data entities that represent one or more non-arbitrary portions of the task strings 502. For example, the refined task strings 504 may include task strings 502 with one or more arbitrary portions removed. The refined task string may represent an executable task that is stripped of all user input and/or other metadata that may be specific to a particular query but not reflective of the intention behind the query.

In some embodiments, a task-specific hash for an executable task is generated by applying a hashing function 508 to a refined task string representative of the executable task.

In some embodiments, the hashing function 508 is a data entity that describes parameters, hyper-parameters, and/or defined operations of an algorithm configured to generate a hashed value from an unhashed value. The hashing function 508 may include any type of hashing algorithm, such as MD5, SHA-1, SHA-2, SHA-3, among others. The hashing function 508 may be applied to any data entity, such as an execution plan 406, executable tasks 412a-c, task strings 502, refined task strings 504, and/or any other representation of a federated query 402 to generate a unique hashed identifier for the federated query 402 and/or result set 414 related thereto.

In some embodiments, the task-specific hashes 506 are unique identifiers corresponding to a portion of a federated query 402. For example, a task-specific hash may include a random hashed value for uniquely identifying an executable task of the execution plan 406. In some examples, a task-specific hash may be generated by applying the hashing function 508 to a particular executable task. By way of example, the task-specific hash may be generated by applying the hashing function 508 to the task strings 502, refined task strings 504, and/or the like.

In some embodiments, the result set hash 516 is generated by generating a respective task-specific hash for each of the plurality of executable tasks 412a-c of the execution plan 406. In this way, a result set hash 516 may be generated that includes a plurality of task-specific hashes 506. As described herein, the task-specific hashes 506 may be ordered in one or more different sequence to generate a plurality of different hash combination sequences 514. The hash combination sequences 514 that may be leveraged to determine the query uniqueness status 520 for the federated query 402.

In some embodiments, the query uniqueness status 520 is determined for the federated query 402 based on a comparison between the result set hash 516 and a plurality of historical result set hashes 518. For example, the result set hash 516 may be compared with historical result set hashes 518 of a local state lookup table 512 to determine the query uniqueness status 520 of the federated query 402. In some examples, the result set hash 516 may be stored in the local state lookup table 512 based on the query uniqueness status 520. By way of example, the local state lookup table 512 may be augmented with the result set hash 516 in the event that the result set hash 516 identifies a unique federated query.

In some embodiments, the local state lookup table 512 is a data entity that represents one or more historical federated queries. By way of example, the local state lookup table 512 may include a list of previously executed federated queries, active result sets, time intervals for the active result sets, query counts for the federated queries, and/or the like. In some embodiments, one or more result set parameters may be determined from the local state lookup table 512. By way of example, the query count for federated query may be determined based on a comparison between a result set hash to a plurality of historical result set hashes. In addition, or alternatively, the historical access frequency may be indicative of a query count for a portion (e.g., a data segment, etc.) of the result set. For example, the historical access frequency may include a respective query count for one or more data segments of a result set.

In some embodiments, the historical result set hashes 518 are data entities that represent a previously resolved federated query. A historical result set hash may include a hash combination sequence corresponding to a recently executed federated query. In some examples, the historical result set hash may include a result set hash for a federated query that has been resolved within a threshold time period. The threshold time period may be based on the intermediary local data source 312. For example, the historical result set hash may represent a result set that is stored in the intermediary local data source 312. In some examples, a plurality of historical result set hashes 518 may be stored in a local state lookup table 512 that identifies each result set maintained within an intermediary local data source 312.

In some embodiments, the query uniqueness status 520 is determined by comparing the historical result set hashes 518 to a plurality of hash combination sequences 514 for a federated query 402. For example, the plurality of hash combination sequences 514 may be generated for the result set hash 516. In some embodiments, a hash combination sequence is a sequence of one or more task-specific hashes. In some examples, a result set hash 516 may be represented by one or more different hash combination sequences. For example, a result set hash 516 may be order agnostic, such that each hash combination sequence may represent the same result set.

In some examples, each of the hash combination sequences 514 may be compared against each of the historical result set hashes 518 to determine the query uniqueness status 520. In some examples, the federated query 402 may be determined as a unique federated query in response to a determination that each of the plurality of hash combination sequences 514 is distinct from each of the historical result set hashes 518.

In some embodiments, a query uniqueness status 520 is a data parameter that indicates whether the federated query 402 that results in the particular result set 414 is unique. For example, the query uniqueness status 520 may be indicative of a unique federated query and/or a non-unique federated query. The federated query 402 may be a non-unique federated query in the event that the same or similar federated query was previously executed and resulted in a result set that matches the particularly result set 414. In some examples, the query uniqueness status 520 may be based on the local state lookup table 512. For example, the query uniqueness status 520 may indicate that a federated query 402 is not unique in the event that a result set hash 516 corresponding to the federated query 402 matches a historical result set hash of the local state lookup table 512. In addition, or alternatively, the query uniqueness status 520 may indicate that a federated query 402 is unique in the event that the result set hash 516 corresponding to the federated query 402 does not match a historical result set hash of the local state lookup table 512.

In some examples, the query uniqueness status 520 may indicate whether a federated query 402 should be resolved to obtain a result set 414. For example, in the event the that federated query 402 is not unique, a result set 414 for the federated query 402 may already be stored in an intermediary local data source 312. In such a case, the result set 414 may be obtained from the intermediary local data source 312 instead of executing the federated query 402. As another example, in the event the that federated query 402 is unique, a result set 414 for the federated query 402 may not be stored in the intermediary local data source 312. In such a case, the result set 414 may be generated by resolving the federated query 402.

Figure 6:
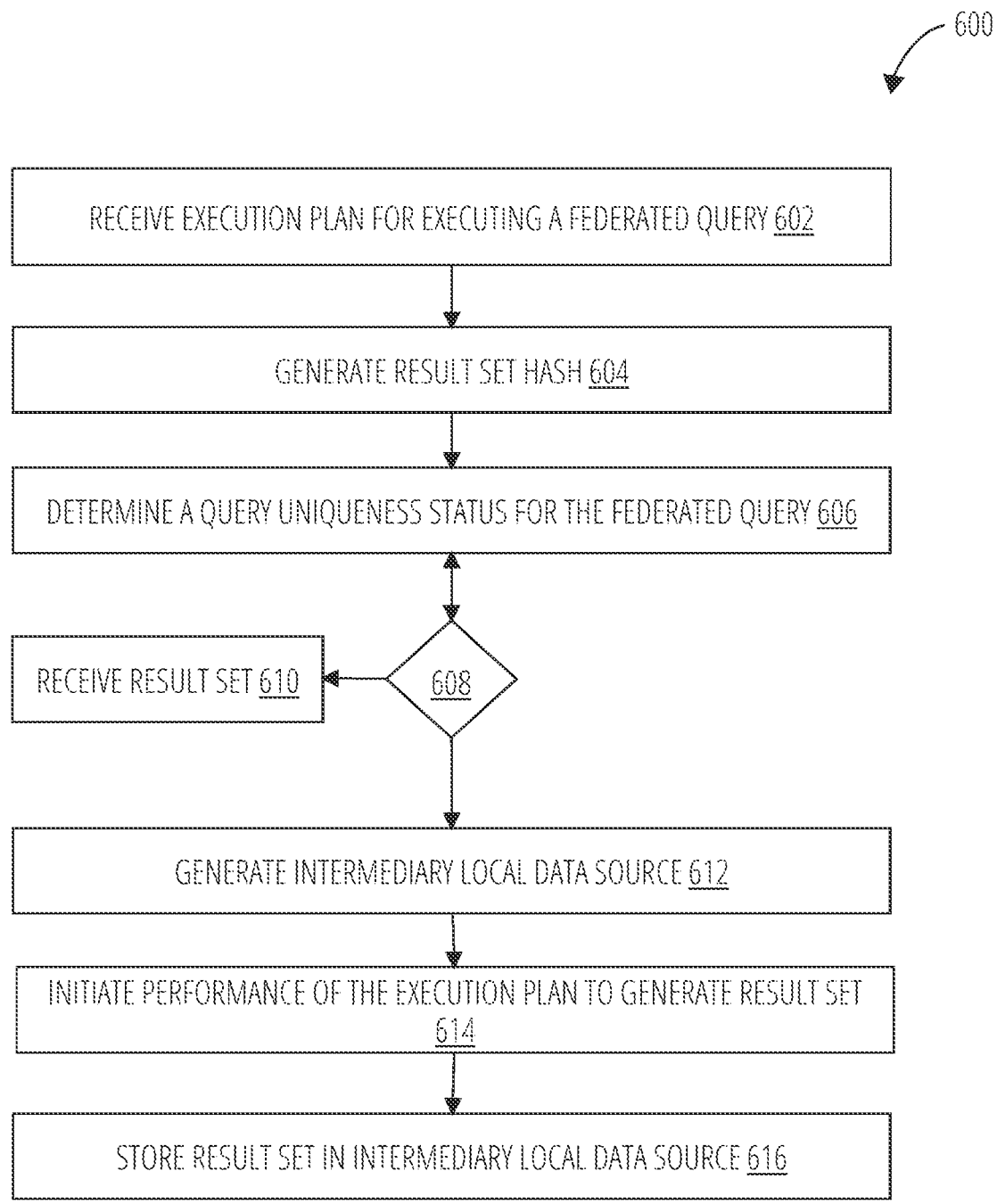
FIG. 6 is a flowchart showing an example of a process for generating a time interval for an intermediary local data source corresponding to a result set of federated query in accordance with some embodiments discussed herein.

FIG. 6 is a flowchart showing an example of a process 600 for generating a time interval for an intermediary local data source corresponding to a result set of federated query in accordance with some embodiments discussed herein. The flowchart depicts federated query processing techniques for dynamically identifying, caching, and modifying cache parameters for results sets generated by a federated query engine to overcome various limitations of traditional federated query engines. The federated query processing techniques may be implemented by one or more computing devices, entities, and/or systems described herein. For example, via the various steps/operations of the process 600, the computing system 100 may leverage the federated query processing techniques to overcome the various limitations with traditional federated query engines by determining a uniqueness of a federated query and, in response to a unique query, tailoring cache parameters to a result set of the unique federated query.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, receiving an execution plan for executing a federated query. For example, the computing system 100 may receive the execution plan for executing the federated query. For instance, the execution plan may include a plurality of executable tasks for generating a result set from a plurality of third-party data sources. In some examples, the execution plan is generated by a federated query engine according to an optimized execution strategy. In some examples, each of the plurality of executable tasks may include one or more query operations for performing a portion of the federated query.

In some embodiments, the process 600 includes, at step/operation 604, generating a result set hash. For example, the computing system 100 may generate the result set hash for the federated query based on the execution plan. For instance, the result set hash may include a sequence of task-specific hashes corresponding to the plurality of executable tasks.

In some embodiments, the process 600 includes, at step/operation 606, determining a query uniqueness status for the federated query. For example, the computing system 100 may determine the query uniqueness status for the federated query based on a comparison between the result set hash and a plurality of historical result set hashes. For instance, the query uniqueness status may be indicative of a unique federated query and/or a non-unique federated query.

In some embodiments, the process 600 includes, at step/operation 608, determining whether the federated query is a unique query. For example, the computing system 100 may determine whether the federated query is a unique query. In the event that the federated query is not a unique query, the process 600 may proceed to step/operation 610 in which the computing system 100 may receive a result set for the federated query without executing the execution plan. In the event that the federated query is a unique query, the process 600 may proceed to step/operation 612.

In some embodiments, the process 600 includes, at step/operation 612, generating an intermediary local data source. For example, the computing system 100 may generate the intermediary local data source for a result set of the federate query in response to determining that the federated query is a unique query.

In some embodiments, in response to determining that the federated query is a unique query, the computing system 100 generates a time interval for the intermediary local data source. The time interval may be indicative of a refresh rate for the intermediary local data source. In addition, or alternatively, the time interval may be indicative of a time-to-live for the intermediary local data source.

In some examples, the computing system 100 may receive one or more result set parameters for the result set. The computing system 100 may generate, using a machine learning model, the time interval based on the one or more result set parameters. The one or more result set parameters may be indicative of at least one of: (i) a historical access frequency for the result set, (ii) a query complexity for the federated query, and/or (iii) a data staleness threshold for the result set. The query complexity may be based on one or more access rate for the plurality of third-party data sources. The data staleness threshold may be (i) a data producer threshold corresponding to at least one of the plurality of third-party data sources and/or (ii) a data consumer threshold corresponding to a first-party that initiated the federated query.

In some embodiments, the computing system 100 may receive one or more parameter updates for the one or more result set parameters. The computing system 100 may modify, using the machine learning model, the time interval based on the one or more parameter updates. The one or more parameter updates, for example, may be based on one or more subsequent federated queries to the result set.

In some embodiments, the process 600 includes, at step/operation 614, initiating the performance of the execution plan to generate the result set. For example, the computing system 100 may initiate the performance of the execution plan to generate the result set. For instance, the computing system 100 may initiate the performance of the federated query based on the execution plan in response to a determination that the federated query is a unique query. By enabling the determination of unique federated queries, the process 600 may improve the allocation of computing resources by reducing the execution of redundant federated queries. In this way, some embodiments of the present disclosure may be practically applied to provide a technical improvement to computers and, more specifically, to federated queries engines.

In some embodiments, the process 600 includes, at step/operation 616, storing the result set in the intermediary local data source. For example, the computing system 100 may store the result set in the intermediary local data source.

Figure 7:
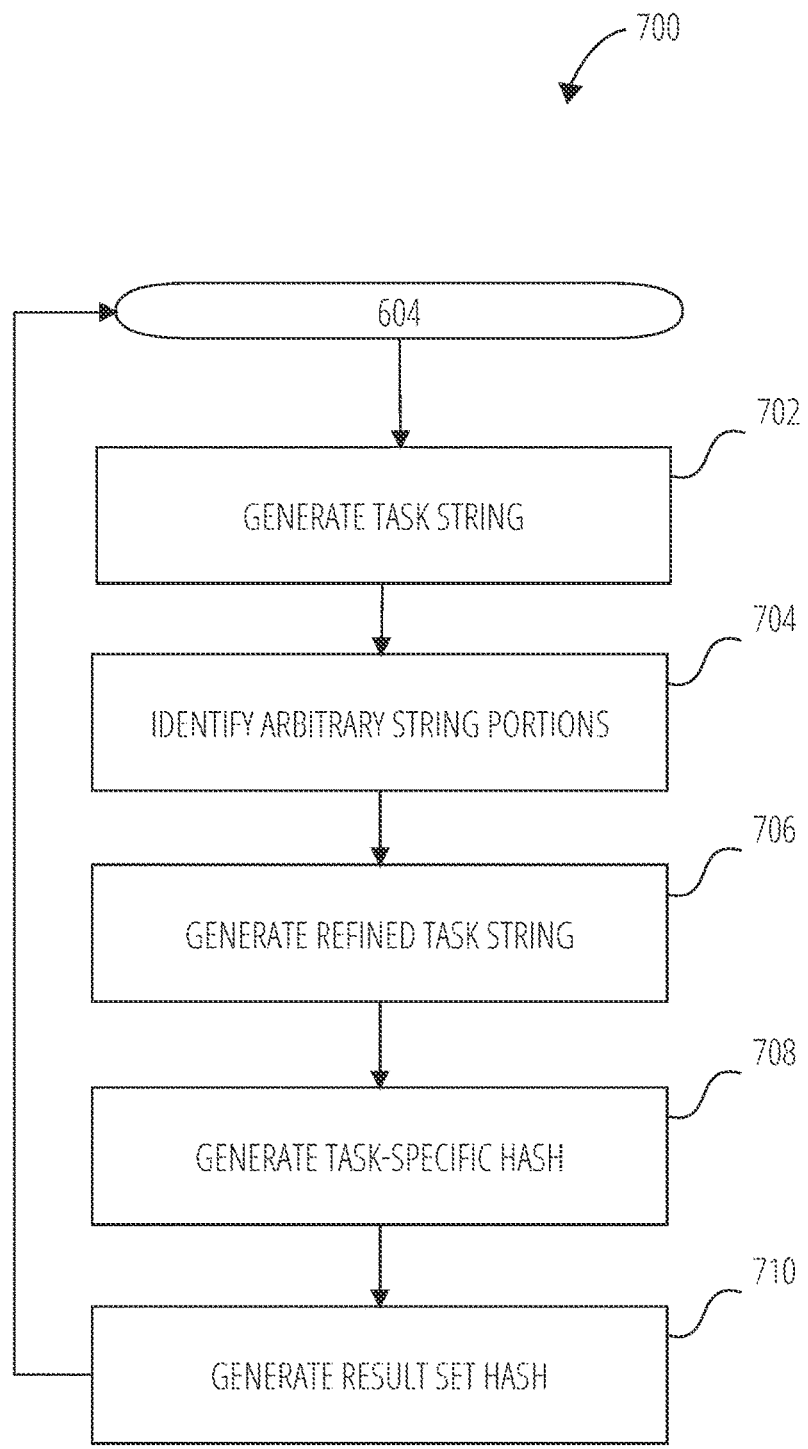
FIG. 7 is a flowchart showing an example of a process for generating a result set hash in accordance with some embodiments discussed herein.

FIG. 7 is a flowchart showing an example of a process 700 for generating a result set hash in accordance with some embodiments discussed herein. The flowchart depicts federated query processing techniques for uniquely identifying complex federated queries to overcome various limitations of traditional federated query engines. The federated query processing techniques may be implemented by one or more computing devices, entities, and/or systems described herein. For example, via the various steps/operations of the process 700, the computing system 100 may leverage the federated query processing techniques to overcome the various limitations with traditional federated query engines by generating unique identifiers for federated queries that may be universally applied across a federated query system to identify, track, and manage a diverse set of federated queries.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence. In some examples, the process 700 may include a subset of operations of the step/operation 604 in which the process 600 generates a result set hash for a federated query and/or result set corresponding thereto.

In some embodiments, the process 700 includes, at step/operation 702, generating a task string. For example, the computing system 100 may generate a task string for an executable task of an execution plan.

In some embodiments, the process 700 includes, at step/operation 704, identifying arbitrary string portions. For example, the computing system 100 may identify one or more arbitrary string portions from the task string. For instance, each of the one or more arbitrary string portions may be indicative of a redundant portion of the executable task.

In some embodiments, the process 700 includes, at step/operation 706, generating a refined task string. For example, the computing system 100 may generate the refined task string for the executable task by removing the one or more arbitrary string portions from the task string.

In some embodiments, the process 700 includes, at step/operation 708, generating a task-specific hash. For example, the computing system 100 may generate the task-specific hash for the executable task by applying a hashing function to the refined task string.

In some embodiments, the process 700 includes, at step/operation 710, generating a result set hash. For example, the computing system 100 may generate the result set hash based on the task-specific hash. For instance, the computing system 100 may generate a respective task-specific hash for each of the plurality of executable tasks. The result set hash may include the respective task-specific hashes. In this way, the process 700 may generate a unique identifier that uniquely identifies a federated query based on the intent (e.g., desired result set) behind the federated query. The result set hash may be universally applied across a federated query system to identify, track, and manage a diverse set of federated queries. By doing so, the process 700 may be practically applied to provide technical improvements to the identification, tracking, and management of federated queries in a federated queries engine.

Figure 8:
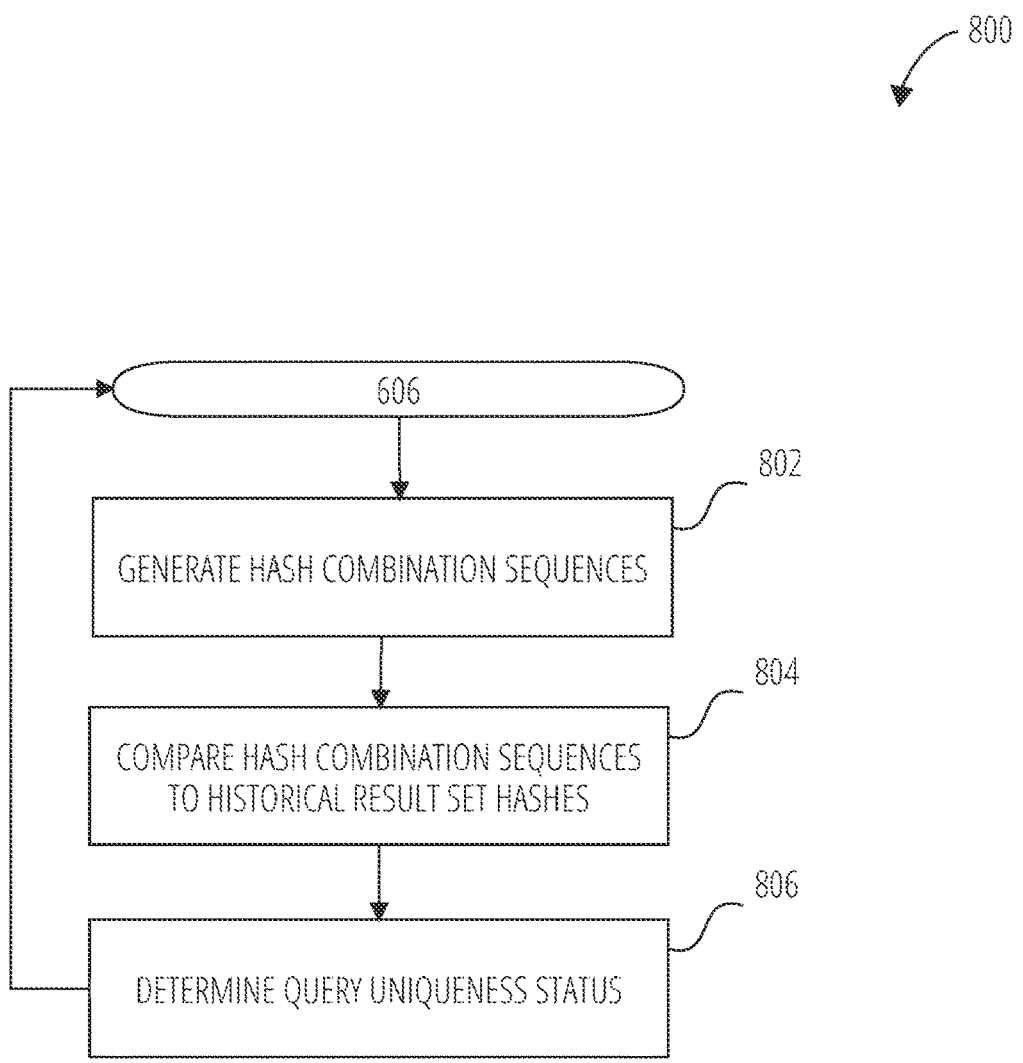
FIG. 8 is a flowchart showing an example of a process for determining a query uniqueness status in accordance with some embodiments discussed herein.

FIG. 8 is a flowchart showing an example of a process 800 for determining a query uniqueness status in accordance with some embodiments discussed herein. The flowchart depicts federated query processing techniques for identifying the uniqueness of a federated query to overcome various limitations of traditional federated query engines. The federated query processing techniques may be implemented by one or more computing devices, entities, and/or systems described herein. For example, via the various steps/operations of the process 800, the computing system 100 may leverage the federated query processing techniques to overcome the various limitations with traditional federated query engines by enabling the determination of a unique federated query.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence. In some examples, the process 800 may include a subset of operations of the step/operation 606 in which the process 600 determines a query uniqueness status for a federated query and/or result set corresponding thereto.

In some embodiments, the process 800 includes, at step/operation 802, generating hash combination sequences. For example, the computing system 100 may generate a plurality of hash combination sequences for a federated query.

In some embodiments, the process 800 includes, at step/operation 804, comparing the hash combination sequences to historical result set hashes. For example, the computing system 100 may compare each of the hash combination sequences to each of a plurality of historical result set hashes. For instance, the plurality of historical result set hashes may be stored in a local state lookup table. In some examples, the computing system 100 may store the result set hash for the federated query in the local state lookup table.

In some embodiments, the process 800 includes, at step/operation 806, determining a query uniqueness status. For example, the computing system 100 may determine the query uniqueness status for a federated query. For instance, the computing system 100 may determine that the federated query is a unique federated query in response to a determination that each of the plurality of hash combination sequences is distinct from each of the historical result set hashes. In this manner, the process 800 may enable the detection of a unique query to inform query operation. This capability may be practically applied to provide an improvement to computer functionality and, more specifically, federated query engines, by empowering the intelligent allocation of computing resources to unique queries that require execution as opposed to redundant queries with available result sets.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising: receiving, by one or more processors, an execution plan for executing a federated query, wherein the execution plan comprises a plurality of executable tasks for generating a result set from a plurality of third-party data sources; generating, by the one or more processors, a result set hash for the result set based on the execution plan, wherein the result set hash comprises a sequence of task-specific hashes corresponding to the plurality of executable tasks; determining, by the one or more processors, a query uniqueness status for the federated query based on a comparison between the result set hash and a plurality of historical result set hashes, wherein the query uniqueness status is indicative of a unique federated query or a non-unique federated query; and in response to determining that the federated query is a unique query, generating, by the one or more processors, a time interval for an intermediary local data source corresponding to the result set.

Example 2. The computer-implemented method of example 1, wherein the execution plan is generated by a federated query engine according to an optimized execution strategy, wherein each of the plurality of executable tasks comprises one or more query operations for performing a portion of the federated query.

Example 3. The computer-implemented method of example 2, wherein generating the result set hash comprises: generating a respective task-specific hash for each of the plurality of executable tasks, wherein a task-specific hash for an executable task is generated by: generating a task string that is indicative of the executable task, identifying one or more arbitrary string portions for the task string, wherein each of the one or more arbitrary string portions is indicative of a redundant portion of the executable task, generating a refined task string by removing the one or more arbitrary string portions from the task string, and generating the task-specific hash by applying a hashing function to the refined task string.

Example 4. The computer-implemented method of any of the preceding examples, wherein the plurality of historical result set hashes are stored in a local state lookup table, and wherein the computer-implemented method further comprises: storing the result set hash in the local state lookup table.

Example 5. The computer-implemented method of any of the preceding examples further comprising: generating the intermediary local data source corresponding to the result set; initiating the performance of the federated query based on the execution plan; and storing the result set in the intermediary local data source.

Example 6. The computer-implemented method of any of the preceding examples, wherein determining the query uniqueness status for the federated query comprises: generating a plurality of hash combination sequences for the result set hash, comparing each of the plurality of hash combination sequences to each of the plurality of historical result set hashes, and determining that the federated query is the unique federated query in response to a determination that each of the plurality of hash combination sequences is distinct from each of the plurality of historical result set hashes.

Example 7. The computer-implemented method of any of the preceding examples, wherein the time interval is indicative of a refresh rate for the intermediary local data source.

Example 8. The computer-implemented method of any of the preceding examples, wherein the time interval is indicative of a time-to-live for the intermediary local data source.

Example 9. The computer-implemented method of any of the preceding examples, wherein generating the time interval comprises: receiving one or more result set parameters for the result set; and generating, using a machine learning model, the time interval based on the one or more result set parameters.

Example 10. The computer-implemented method of example 9, wherein the one or more result set parameters are indicative of at least one of: (i) a historical access frequency for the result set, (ii) a query complexity for the federated query, or (iii) a data staleness threshold for the result set.

Example 11. The computer-implemented method of example 10, wherein the query complexity is based on one or more access rate for the plurality of third-party data sources.

Example 12. The computer-implemented method of examples 10 or 11, wherein the data staleness threshold comprises a data producer threshold corresponding to at least one of the plurality of third-party data sources.

Example 13. The computer-implemented method of any of examples 10 through 12, wherein the data staleness threshold comprises a data consumer threshold corresponding to a first-party that initiated the federated query.

Example 14. The computer-implemented method of any of examples 9 through 13 further comprising: receiving one or more parameter updates for the one or more result set parameters; and modifying, using the machine learning model, the time interval based on the one or more parameter updates.

Example 15. The computer-implemented method of example 14, wherein the one or more parameter updates are based on one or more subsequent federated queries to the result set.

Example 16. A computing apparatus comprising memory and one or more processors communicatively coupled to the memory, the one or more processors configured to: receive an execution plan for executing a federated query, wherein the execution plan comprises a plurality of executable tasks for generating a result set from a plurality of third-party data sources; generate a result set hash for the result set based on the execution plan, wherein the result set hash comprises a sequence of task-specific hashes corresponding to the plurality of executable tasks; determine a query uniqueness status for the federated query based on a comparison between the result set hash and a plurality of historical result set hashes, wherein the query uniqueness status is indicative of a unique federated query or a non-unique federated query; and in response to determining that the federated query is a unique query, generate a time interval for an intermediary local data source corresponding to the result set.

Example 17. The computing apparatus of example 16, wherein the execution plan is generated by a federated query engine according to an optimized execution strategy, wherein each of the plurality of executable tasks comprises one or more query operations for performing a portion of the federated query.

Example 18. The computing apparatus of example 17, wherein generating the result set hash comprises: generating a respective task-specific hash for each of the plurality of executable tasks, wherein a task-specific hash for an executable task is generated by: generating a task string that is indicative of the executable task, identifying one or more arbitrary string portions for the task string, wherein each of the one or more arbitrary string portions is indicative of a redundant portion of the executable task, generating a refined task string by removing the one or more arbitrary string portions from the task string, and generating the task-specific hash by applying a hashing function to the refined task string.

Example 19. The computing apparatus of any of examples 16 through 18, wherein generating the result set hash comprises: receiving one or more result set parameters for the result set; and generating, using a machine learning model, the time interval based on the one or more result set parameters.

Example 20. One or more non-transitory computer-readable storage media including instructions that, when executed by one or more processors, cause the one or more processors to: receive an execution plan for executing a federated query, wherein the execution plan comprises a plurality of executable tasks for generating a result set from a plurality of third-party data sources; generate a result set hash for the result set based on the execution plan, wherein the result set hash comprises a sequence of task-specific hashes corresponding to the plurality of executable tasks; determine a query uniqueness status for the federated query based on a comparison between the result set hash and a plurality of historical result set hashes, wherein the query uniqueness status is indicative of a unique federated query or a non-unique federated query; and in response to determining that the federated query is a unique query, generate a time interval for an intermediary local data source corresponding to the result set.

The invention claimed is:

1. A computer-implemented method comprising:
receiving, by one or more processors, an execution plan for executing a federated query, wherein the execution plan comprises a plurality of executable tasks for generating a result set from a plurality of third-party data sources;
generating, by the one or more processors, a result set hash for the result set based on the execution plan, wherein the result set hash comprises a sequence of task-specific hashes corresponding to the plurality of executable tasks;
determining, by the one or more processors, a query uniqueness status for the federated query based on a comparison between the result set hash and a plurality of historical result set hashes, wherein the query uniqueness status is indicative of a unique federated query or a non-unique federated query; and
in response to determining that the federated query is the unique federated query, generating, by the one or more processors, a time interval for an intermediary local data source corresponding to the result set.

2. The computer-implemented method of claim 1, wherein the execution plan is generated by a federated query engine according to an optimized execution strategy, wherein an executable task of the plurality of executable tasks comprises one or more query operations for performing a portion of the federated query.

3. The computer-implemented method of claim 2, wherein generating the result set hash comprises:
generating a task-specific hash for the executable task, wherein the task-specific hash for the executable task is generated by:
generating a task string that is indicative of the executable task,
identifying one or more arbitrary string portions for the task string, wherein an arbitrary string portion of the one or more arbitrary string portions is indicative of a redundant portion of the executable task,
generating a refined task string by removing the one or more arbitrary string portions from the task string, and
generating the task-specific hash by applying a hashing function to the refined task string.

4. The computer-implemented method of claim 1, wherein the plurality of historical result set hashes is stored in a local state lookup table, and wherein the computer-implemented method further comprises:
storing the result set hash in the local state lookup table.

5. The computer-implemented method of claim 1 further comprising:
generating the intermediary local data source corresponding to the result set;
initiating the performance of the federated query based on the execution plan; and
storing the result set in the intermediary local data source.

6. The computer-implemented method of claim 1, wherein determining the query uniqueness status for the federated query comprises:
generating a plurality of hash combination sequences for the result set hash; and
determining that the federated query is the unique federated query in response to a determination that each of the plurality of hash combination sequences is distinct from each of the plurality of historical result set hashes.

7. The computer-implemented method of claim 1, wherein the time interval is indicative of a refresh rate for the intermediary local data source.

8. The computer-implemented method of claim 1, wherein the time interval is indicative of a time-to-live for the intermediary local data source.

9. The computer-implemented method of claim 1, wherein generating the time interval comprises:
receiving one or more result set parameters for the result set; and
generating, using a machine learning model, the time interval based on the one or more result set parameters.

10. The computer-implemented method of claim 9, wherein the one or more result set parameters are indicative of at least one of: (i) a historical access frequency for the result set, (ii) a query complexity for the federated query, or (iii) a data staleness threshold for the result set.

11. The computer-implemented method of claim 10, wherein the query complexity is based on an access rate for the plurality of third-party data sources.

12. The computer-implemented method of claim 10, wherein the data staleness threshold comprises a data producer threshold corresponding to at least one of the plurality of third-party data sources.

13. The computer-implemented method of claim 10, wherein the data staleness threshold comprises a data consumer threshold corresponding to a first party that initiated the federated query.

14. The computer-implemented method of claim 9 further comprising:
receiving one or more parameter updates for the one or more result set parameters; and
modifying, using the machine learning model, the time interval based on the one or more parameter updates.

15. The computer-implemented method of claim 14, wherein the one or more parameter updates are based on one or more subsequent federated queries to the result set.

16. A computing system comprising memory and one or more processors communicatively coupled to the memory, the memory comprising instructions that, when executed by the one or more processors, cause the one or more processors to:
receive an execution plan for executing a federated query, wherein the execution plan comprises a plurality of executable tasks for generating a result set from a plurality of third-party data sources;

generate a result set hash for the result set based on the execution plan, wherein the result set hash comprises a sequence of task-specific hashes corresponding to the plurality of executable tasks;

determine a query uniqueness status for the federated query based on a comparison between the result set hash and a plurality of historical result set hashes, wherein the query uniqueness status is indicative of a unique federated query or a non-unique federated query; and in response to the determination that the federated query is the unique federated query, generate a time interval for an intermediary local data source corresponding to the result set.

17. The computing system of claim 16, wherein the execution plan is generated by a federated query engine according to an optimized execution strategy, wherein an executable task of the plurality of executable tasks comprises one or more query operations for performing a portion of the federated query.

18. The computing system of claim 17, wherein, to generate the result set hash, the instructions further cause the one or more processors to:

generate a task-specific hash for the executable task, wherein the task-specific hash for an executable task is generated by:
  generating a task string that is indicative of the executable task,
  identifying one or more arbitrary string portions for the task string, wherein an arbitrary string portion of the one or more arbitrary string portions is indicative of a redundant portion of the executable task,
  generate a refined task string by removing the one or more arbitrary string portions from the task string, and
  generate the task-specific hash by applying a hashing function to the refined task string.

19. The computing system of claim 16, wherein, to generate the result set hash, the instructions further cause the one or more processors to:

receive one or more result set parameters for the result set; and generate, using a machine learning model, the time interval based on the one or more result set parameters.

20. One or more non-transitory computer-readable storage media including instructions that, when executed by one or more processors, cause the one or more processors to:

receive an execution plan for executing a federated query, wherein the execution plan comprises a plurality of executable tasks for generating a result set from a plurality of third-party data sources;

generate a result set hash for the result set based on the execution plan, wherein the result set hash comprises a sequence of task-specific hashes corresponding to the plurality of executable tasks;

determine a query uniqueness status for the federated query based on a comparison between the result set hash and a plurality of historical result set hashes, wherein the query uniqueness status is indicative of a unique federated query or a non-unique federated query; and in response to the determination that the federated query is the unique federated query, generate a time interval for an intermediary local data source corresponding to the result set.

* * * * *

UNITED STATES PATENT AND TRADEMARK OFFICE
CERTIFICATE OF CORRECTION

PATENT NO. : 12,204,538 B1
APPLICATION NO. : 18/242954
DATED : January 21, 2025
INVENTOR(S) : Srivatsan Srinivasan et al.

Page 1 of 1

It is certified that error appears in the above-identified patent and that said Letters Patent is hereby corrected as shown below:

In the Claims

In Column 39, Line 27, Claim 18, delete "an" and insert -- the --, therefor.

In Column 40, Line 1, Claim 18, delete "generate" and insert -- generating --, therefor.

In Column 40, Line 4, Claim 18, delete "generate" and insert -- generating --, therefor.

Signed and Sealed this
Twenty-sixth Day of August, 2025

Coke Morgan Stewart
*Acting Director of the United States Patent and Trademark Office*